(12) United States Patent
Cao

(10) Patent No.: US 12,143,188 B2
(45) Date of Patent: Nov. 12, 2024

(54) NETWORK DEVICE, USER EQUIPMENT, WIRELESS COMMUNICATION METHOD AND STORAGE MEDIUM

(71) Applicant: Sony Group Corporation, Tokyo (JP)

(72) Inventor: Jianfei Cao, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 49 days.

(21) Appl. No.: 18/075,441

(22) Filed: Dec. 6, 2022

(65) Prior Publication Data

US 2023/0102698 A1    Mar. 30, 2023

Related U.S. Application Data

(63) Continuation of application No. 17/258,172, filed as application No. PCT/CN2018/113905 on Nov. 5, 2018, now abandoned.

(30) Foreign Application Priority Data

Sep. 26, 2018    (CN) .......................... 201811123667.5

(51) Int. Cl.
*H04B 7/06*    (2006.01)
*H04B 7/08*    (2006.01)
(Continued)

(52) U.S. Cl.
CPC ........... *H04B 7/0695* (2013.01); *H04B 7/088* (2013.01); *H04L 5/0051* (2013.01);
(Continued)

(58) Field of Classification Search
CPC .... H04B 7/0695; H04B 7/088; H04B 7/0404; H04B 7/0691; H04L 5/0051;
(Continued)

(56) References Cited

U.S. PATENT DOCUMENTS

2020/0137592 A1* 4/2020 Guo ...................... H04B 7/0404
2020/0169304 A1* 5/2020 Chen .................... H04B 7/0482
2021/0136768 A1* 5/2021 Kang ........................ H04L 1/00

FOREIGN PATENT DOCUMENTS

CN    106686620 A    5/2017
CN    108112075 A    6/2018
(Continued)

OTHER PUBLICATIONS

Huawei, HiSilicon, Discussion on panel-based UL beam selection, 3GPP TSG RAN WG1 Meeting #94, Gothenburg, Sweden, Aug. 20-24, 2018, R1-1809122 (Year: 2018).*

(Continued)

*Primary Examiner* — Shailendra Kumar
(74) *Attorney, Agent, or Firm* — XSENSUS LLP

(57) ABSTRACT

The present invention relates to a network device, a user equipment, a wireless communication method and a storage medium. The network device comprises a processing circuit, configured to: provide to the user equipment a transmitted beam for sending an uplink signal from a plurality of transmitted beams on a plurality of antenna boards of the user equipment, and generate configuration information which indicates the transmitted beam for sending the uplink signal. By means of the network device, the user equipment, the wireless communication method and the storage medium, the network device can inform the user equipment of the selected uplink transmitted beam in the case that the (Continued)

user equipment is provided with a plurality of antenna boards, so as to optimize the process of determining the uplink transmitted beam.

7 Claims, 10 Drawing Sheets

(51) Int. Cl.
  *H04L 5/00* (2006.01)
  *H04L 25/02* (2006.01)
  *H04W 72/044* (2023.01)
  *H04W 72/23* (2023.01)
(52) U.S. Cl.
  CPC ....... *H04L 25/0226* (2013.01); *H04W 72/046* (2013.01); *H04W 72/23* (2023.01)
(58) Field of Classification Search
  CPC . H04L 25/0226; H04L 5/0094; H04L 5/0025; H04L 5/0048; H04W 72/046; H04W 72/23
  See application file for complete search history.

(56) References Cited

FOREIGN PATENT DOCUMENTS

WO      2014/196962 A1    12/2014
WO    WO-2018128365 A1    12/2018

OTHER PUBLICATIONS

Huawei, 3GPP TSG RAN WG1 Meeting #94 R1-1809122, Discussion on panel-based UL beam selection Aug. 24, 2018, 7pgs., Gothenburg, Sweden.
International Search Report and Written Opinion mailed on Jun. 25, 2019, received for PCT Application PCT/CN2018/113905, Filed on Nov. 5, 2018, 8 pages.
Huawei et al., "Discussion on Panel-Based UL Beam Selection", 3GPP TSG RAN WG1 Meeting #94, R1-1809122, Aug. 20-24, 2018, 7 pages.
Vivo, "Discussion on Beam Measurement, Beam Reporting and Beam Indication", 3GPP TSG RAN WG1 NR Ad Hoc #3, R1-1715619, Sep. 18-21, 2017, 10 pages.

* cited by examiner

NETWORK DEVICE, USER EQUIPMENT, WIRELESS COMMUNICATION METHOD AND STORAGE MEDIUM

CROSS-REFERENCE TO RELATED APPLICATIONS

The present application is a continuation of U.S. application Ser. No. 17/258,172, filed Jan. 6, 2021, which is based on PCT filing PCT/CN2018/113905, filed Nov. 5, 2018, which claims priority to Chinese Patent Application No. 201811123667.5, titled "NETWORK DEVICE, USER EQUIPMENT, WIRELESS COMMUNICATION METHOD AND STORAGE MEDIUM", filed on Sep. 26, 2018 with the National Intellectual Property Administration, PRC, each of which is incorporated herein by reference in its entirety.

FIELD

The present disclosure relates to the technical field of wireless communications, and in particular to a network side equipment, a user equipment, wireless communication methods, and a computer-readable storage medium. More particularly, the present disclosure relates to a network side equipment in a wireless communication system, a user equipment in a wireless communication system, a wireless communication method performed by a network side equipment in a wireless communication system, a wireless communication method performed by a user equipment in a wireless communication system, and a computer-readable storage medium.

BACKGROUND

Beamforming technology is a signal preprocessing technology based on an antenna array. With the beamforming technology, a directional beam is generated by adjusting a weighting coefficient of each element in the antenna array, so as to obtain a significant array gain. Therefore, the beamforming technology has great advantages in terms of expanding coverage, improving edge throughput, interference suppression and the like. During an uplink transmission using the beamforming technology, a network side equipment may select a suitable uplink transmit beam for a user equipment and notify the user equipment of the selected uplink transmit beam, so that the user equipment may send uplink signals by using the uplink transmit beam selected by the network side equipment.

In recent studies, it has been proposed a configuration that a user equipment may be provided with multiple antenna panels, and each of the antenna panels may independently emit beams of multiple directions. That is, each antenna panel can only emit beam of one direction on one OFDM (Orthogonal Frequency Division Multiplexing) symbol or one time slot, and different antenna panels can independently emit beams of their respective directions on one OFDM symbol or one time slot. In this case, the conventional communication standards cannot be applied to the configuration that a user equipment is provided with multiple antenna panels. That is, in the case that the user equipment is provided with multiple antenna panels, one of the technical problems to be solved urgently is how to notify the user equipment of the selected uplink transmit beam by the network side equipment.

Therefore, it is required to propose a technical solution to enable the network side equipment to notify the user equipment of the selected uplink transmit beam in a case that the user equipment is provided with multiple antenna panels, so as to optimize a process of determining an uplink transmit beam.

SUMMARY

This section provides a general summary of the present disclosure, rather than fully disclosing a full scope or all features of the present disclosure.

An object of the present disclosure is to provide a network side equipment, a user equipment, wireless communication methods, and a storage medium, so that the network side equipment can notify the user equipment of the selected uplink transmit beam in a case that the user equipment is provided with multiple antenna panels, to optimize a process of determining the uplink transmit beam.

According to an aspect of the present disclosure, a network side equipment is provided, which includes processing circuitry configured to: configure, from among multiple transmit beams on multiple antenna panels of a user equipment, a transmit beam for sending an uplink signal for the user equipment; and generate configuration information indicating the transmit beam for sending the uplink signal.

According to another aspect of the present disclosure, a user equipment is further provided, which includes processing circuitry configured to: receive configuration information indicating a transmit beam for sending an uplink signal; and determine, based on the configuration information and from among multiple transmit beams on multiple antenna panels of a user equipment, the transmit beam for sending the uplink signal.

According to another aspect of the present disclosure, a wireless communication method performed by a network side equipment is further provided, which includes: configuring, from among multiple transmit beams on multiple antenna panels of a user equipment, a transmit beam for sending an uplink signal for the user equipment; and generating configuration information indicating the transmit beam for sending the uplink signal.

According to another aspect of the present disclosure, a wireless communication method performed by a user equipment is further provided, which includes: receiving configuration information indicating a transmit beam for sending an uplink signal; and determining, based on the configuration information and from among multiple transmit beams on multiple antenna panels of a user equipment, the transmit beam for sending the uplink signal.

According to another aspect of the present disclosure, a computer-readable storage medium is provided, which includes executable computer instructions. The executable computer instructions, when executed by a computer, cause the computer to perform the wireless communication method according to the present disclosure.

With the network side equipment, the user equipment, the wireless communication methods, and the computer-readable storage medium according to the present disclosure, the network side equipment can configure the transmit beam for sending the uplink signal for the user equipment from multiple transmit beams on multiple antenna panels of the user equipment, and can generate configuration information indicating the configured transmit beam. In this way, the network side equipment can notify the user equipment of the selected uplink transmit beam in a case that the user equipment is provided with multiple antenna panels, thereby optimizing the process of determining the uplink transmit beam.

From the description provided here, further applicability areas will become apparent. The description and specific examples in this summary are for illustrative purposes only and are not intended to limit the scope of the present disclosure.

BRIEF DESCRIPTION OF THE DRAWINGS

The drawings described herein are only for illustrative purposes of the described embodiments, rather than showing all possible implementations, and are not intended to limit the scope of the present disclosure. In the drawings.

Figure 1:
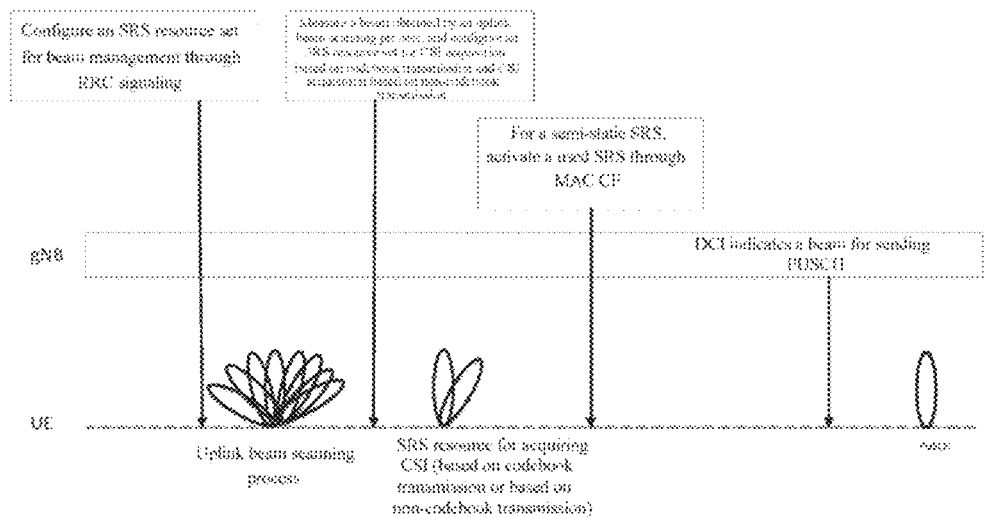
FIG. 1 is a schematic diagram showing a process of selecting a transmit beam for sending an uplink data signal according to the conventional technology.

Although the present disclosure is easily subjected to various modifications and alternative forms, specific embodiments thereof are shown in the drawings as examples and are described in detail herein. However, it should be understood that the description of specific embodiments herein is not intended to limit the present disclosure to specific forms thereof. On the contrary, the purpose of the present disclosure is to cover all modifications, equivalents and replacements that fall within the spirit and scope of the present disclosure. It should be noted that throughout the drawings, reference numerals indicate corresponding components.

DETAILED DESCRIPTION OF EMBODIMENTS

Examples of the present disclosure will be described more fully with reference to the drawings. The following description is merely exemplary, and is not intended to limit the present disclosure, or application and use thereof.

Example embodiments are provided so that the present disclosure is thorough and fully convey its scope to those skilled in the art. Numerous specific details such as examples of specific components, devices, and methods are described to provide a detailed understanding of the embodiments of the present disclosure. It will be apparent to those skilled in the art that the exemplary embodiments may be implemented in many different forms without specific details, which should not be construed as limiting the scope of the present disclosure. In some example embodiments, well-known processes, well-known structures, and well-known technologies are not described in detail.

The description will be given in the following order:
1. Description of the problem;
2. Configuration example of the network side equipment;
3. Configuration example of the user equipment;
4. Method embodiment; and
5. Application examples.

1. Description of the Problem

In the Release 15 version of the 3GPP standard, multiple antenna panels of a user equipment (UE) are in one-to-one correspondence to multiple SRS resource sets, and each of the multiple transmit beams of the UE corresponds to one SRS resource. Further, the base station may configure multiple SRS resource sets for the UE, and different SRS resource sets may be used for different objectives. That is, the beams on different antenna panels of the UE may be used for different objectives, and the beams on the same antenna panel have the same objective. Four objectives are defined in the current standard, namely beam management, Channel State Information (CSI) acquisition based on codebook transmission, and CSI acquisition based on non-codebook transmission, and antenna switch. Each SRS resource set may be configured with one of the above four objectives. The relevant codes in the standard are shown as follows:

```
SRS-ResourceSet ::=            SEQUENCE{
...
Usage              ENUMERATED {beamManagement, codebook, nonCodebook,
antennaSwitching},
...
}
``` where Usage represents an objective of the SRS resource set, which is selected from any one of beam management, CSI acquisition based on codebook transmission, CSI acquisition based on non-codebook transmission, and antenna switch.

FIG. 1 is a schematic diagram showing a process of selecting a transmit beam for sending an uplink data signal according to the conventional technology.

In Release 15 of the 3GPP standard, it is defined that the process for selecting the uplink beam includes three steps of SRS-based beam scanning, Radio Resource Control (RRC) configuration and SRS resource indicator.

As shown in FIG. 1, first, a gNB configures a SRS resource set for beam management for a UE through RRC signaling. Next, the UE may perform an uplink beam scanning process based on the configuration of the gNB. Next, based on the uplink beam scanning process of the UE, the gNB may measure a quality of the acquired beam, such as measuring a Reference Signal Receiving Power (RSRP), so as to select the optimum uplink transmit beam. Further, the base station may configure a SRS resource set for CSI acquisition based on codebook transmission or CSI acquisition based on non-codebook transmission for the UE through the RRC signaling, and configure a transmit beam for each SRS resource in each resource set. Next, the UE may perform SRS beam transmission based on a reconfiguration of the gNB to assist the base station to acquire uplink CSI. Here, the UE may perform the SRS beam transmission by using SRS resources for CSI acquisition based on codebook transmission or CSI acquisition based on non-codebook transmission to assist the base station to acquire the CSI. It should be noted that, for semi-static SRS, the gNB is further required to activate one SRS beam among multiple semi-static SRS beams through the Media Access Control Control Element (MAC CE). Next, after performing necessary measurements, the gNB informs the UE of the selected transmit beam for sending an uplink signal through an SRS Resource Indicator (SRI) in Downlink Control Information (DCI) signaling. Here, the gNB may indicate to the UE an SRS resource in the SRS resource set for CSI acquisition based on codebook transmission that is used in the latest time slot or an SRS resource in a SRS resource set for CSI acquisition based on non-codebook transmission. Next, the UE may perform uplink data transmission by using the beam corresponding to the SRS resource indicated by the gNB, that is, sending a Physical Uplink Shared Channel (PUSCH) signal.

As can be seen from FIG. 1, in the conventional uplink transmit beam selection process, the gNB is required to perform the step of configuring the SRS resource set for the UE through RRC signaling twice. The step performed for the first time is to configure the SRS resource set for beam management, and the step performed for the second time is to configure the SRS resource set for CSI acquisition, which undoubtedly increases signaling overhead. In addition, if the UE moves in the cell, the twice configurations inevitably results in inaccuracy of configuration and may cause unnecessary RRC reconfiguration. Further, for the semi-static SRS, the gNB is required to further activate one of the multiple semi-static SRS beams through the MAC CE, which further increases the signaling overhead and the complexity of the process. In addition, in the process of indication through DCI, DCI indicates an SRS resource in an SRS resource set for CSI acquisition base on codebook transmission or an SRS resource in an SRS resource set for CSI acquisition based on non-codebook transmission, failing to consider information of an antenna panel of the UE.

A similar problem also exists for uplink transmission control, that is, the gNB does not consider the information of the antenna panel of the UE while configuring a transmit beam for sending an uplink non-data signal for the UE.

For such a scenario, a network side equipment in a wireless communication system, a user equipment in a wireless communication system, a wireless communication method performed by a network side equipment in a wireless communication system, a wireless communication method performed by a user equipment in a wireless communication system and a computer-readable storage medium are provided according to the present disclosure, so that the network side equipment can notify the user equipment of the selected uplink transmit beam in a case that the user equipment is provided with multiple antenna panels, thereby simplifying the process of determining the uplink transmit beam, thus reducing signaling overhead and system delay.

The network side equipment according to the present disclosure may be any type of Transmit and Receive Port (TRP). The TRP may have sending and receiving functions, for example, the TRP may receive information from a user equipment and a base station device, and may also transmit information to the user equipment and the base station device. In an example, the TRP may provide services to the user equipment and is controlled by the base station device. That is, the base station device provides services to the user equipment through the TRP. In addition, the network side equipment according to the present disclosure may also be a base station device, for example, the network side equipment may be an eNB (evolved node B) or a gNB.

The user equipment according to the present disclosure may be a mobile terminal (such as a smart phone, a tablet personal computer (PC), a notebook PC, a portable game terminal, a portable/dongle type mobile router, and a digital camera) or an in-vehicle terminal (such as a car navigation device). The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) installed on each of the aforementioned terminals.

2. Configuration Example of the Network Side Equipment

Figure 2:
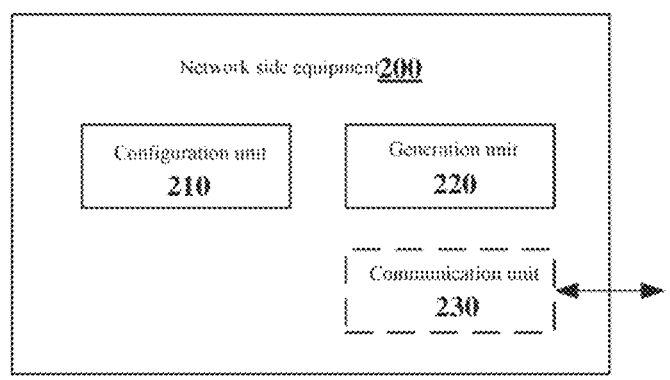
FIG. 2 is a block diagram showing an example of a configuration of a network side equipment according to an embodiment of the present disclosure.

FIG. 2 is a block diagram showing an example of a configuration of a network side equipment 200 according to an embodiment of the present disclosure.

As shown in FIG. 2, the network side equipment 200 may include a configuration unit 210 and a generation unit 220.

Here, each unit of the network side equipment 200 may be included in a processing circuit. It should be noted that the network side equipment 200 may include one processing circuit or multiple processing circuits. Further, the processing circuit may include various discrete functional units to perform various different functions and/or operations. It should be noted that these functional units may be physical entities or logical entities, and units with different names may be implemented by the same physical entity.

According to an embodiment of the present disclosure, the configuration unit 210 may configure a transmit beam for sending an uplink signal for the user equipment from among multiple transmit beams on multiple antenna panels of the user equipment. Here, the user equipment may be located within a service range of the network side equipment, for example, the user equipment may be located geographically within a coverage of the network side equipment 200, or the user equipment may be located close to the network side equipment 200. Further, there may be multiple user equipments within the service range of the network side equipment 200, so the configuration unit 210 may configure a transmit beam for sending an uplink signal for each of the multiple user equipments.

According to an embodiment of the present disclosure, the generation unit 220 may generate configuration information indicating a transmit beam for sending an uplink signal. That is, the configuration information may indicate the transmit beam for sending the uplink signal among the multiple transmit beams on the multiple antenna panels of the user equipment.

It can be seen that the network side equipment 200 according to the embodiment of the present disclosure may configure for the user equipment the transmit beam for sending an uplink signal from among the multiple transmit beams on the multiple antenna panels of the user equipment, and may generate configuration information indicating the configured transmit beam. In this way, the network side equipment 200 can notify the user equipment of the selected uplink transmit beam in a case that the user equipment is provided with multiple antenna panels, thereby optimizing the process of determining the uplink transmit beam.

According to an embodiment of the present disclosure, the user equipment is provided with multiple antenna panels, and the multiple antenna panels are in one-to-one correspondence to multiple SRS resource sets. That is, the number of the antenna panels provided by the user equipment is the same as the number of the SRS resource sets, and there is a one-to-one correspondence between the antenna panels and the SRS resource sets. Further, each antenna panel of the user equipment includes one or more beam directions, that is, for each antenna panel, there is a one-to-one correspondence between beams and SRS resources.

Figure 3:
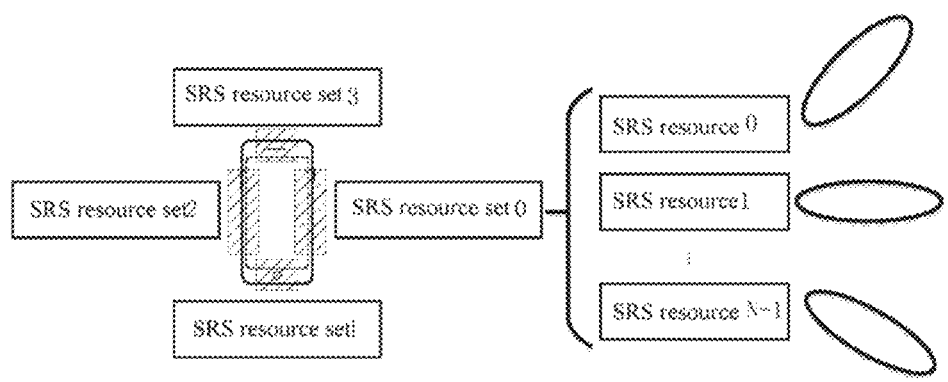
FIG. 3 is a schematic diagram showing a mapping relationship between transmit beams and Sounding Reference Signal (SRS) resources according to an embodiment of the present disclosure.

FIG. 3 is a schematic diagram showing a mapping relationship between transmit beams and SRS resources according to an embodiment of the present disclosure.

As shown in FIG. 3, the user equipment may be provided with four antenna panels, which are arranged in different directions of the user equipment. Therefore, the user equipment may have four SRS resource sets, namely an SRS resource set 0, an SRS resource set 1, an SRS resource set 2, and an SRS resource set 3. Further, a relationship between SRS resources and transmit beams is described by taking the SRS resource set 0 as an example. As shown in FIG. 3, the SRS resource set 0 includes N SRS resources, namely an SRS resource 0, an SRS resource 1, . . . , and an SRS resource N−1, and the N SRS resources are in one-to-one correspondence to N transmit beams. That is, the SRS resource sets are in one-to-one correspondence to the antenna panels, and SRS resources in each of the SRS resource sets are in one-to-one correspondence to beams on an antenna panel corresponding to the SRS resource set. It is to be noted that FIG. 3 only shows a situation where the user equipment has four antenna panels, and the user equipment may also have other numbers of antenna panels. In addition, FIG. 3 only shows a situation of SRS resources included in the SRS resource set 0, and this is also applicable to other SRS resource sets, and each SRS resource set may include one or more SRS resources.

According to an embodiment of the present disclosure, the configuration information generated by the generation unit 220 may indicate the transmit beam for sending the uplink signal among the multiple transmit beams on the multiple antenna panels of the user equipment. That is, the configuration information is capable of indicating which beam on which antenna panel the transmit beam for sending the uplink signal is located.

According to an embodiment of the present disclosure, the transmit beam for sending the uplink signal may include one or more transmit beams. That is, the configuration unit 210 may configure one or more transmit beams for the user equipment to send uplink signals. Further, the configuration information generated by the generation unit 220 may indicate one or more transmit beams for sending uplink signals.

As shown in FIG. 2, according to an embodiment of the present disclosure, the network side equipment 200 may further include a communication unit 230 for sending configuration information to the user equipment.

According to an embodiment of the present disclosure, the uplink signal to be sent by the user equipment may include a data signal. The data signal here may include a PUSCH signal. In a case that the uplink signal to be sent by the user equipment is a data signal, the communication unit 230 may send the generated configuration information to the user equipment through low layer signaling. For example, the low layer signaling may be implemented as DCI signaling of a physical layer, such as DCI format 0.

According to an embodiment of the present disclosure, the uplink signal to be sent by the user equipment may include a non-data signal. The non-data signal here may include an uplink reference signal and an uplink control signal. For example, the uplink control signal may be a Physical Uplink Control Channel (PUCCH) signal, and the uplink reference signal may include an SRS. In a case that the uplink signal to be sent by the user equipment is a non-data signal, the communication unit 230 may send the generated configuration information to the user equipment through high layer signaling. For example, the high layer signaling may include, but is not limited to, RRC signaling.

In the following, an example of indicating a transmit beam for sending an uplink signal according to an embodiment of the present disclosure is described in detail with respect to a data signal, a control signal, and a reference signal.

For the Uplink Data Signal (a PUSCH Signal)

According to an embodiment of the present disclosure, the configuration information generated by the generation unit 220 may include SRS resource set indication information and SRS resource indication information.

According to an embodiment of the present disclosure, the SRS resource set indication information may indicate an SRS resource set where the transmit beam for sending the uplink signal lies. For example, the SRS resource set indication information may include identification information of the SRS resource set where the transmit beam for sending the uplink signal lies. For example, the SRS resource sets may be numbered, and the number of the SRS resource set for sending the uplink signal may be indicated by using SRS Resource Set Indicator (SRSI).

According to an embodiment of the present disclosure, the SRS resource indication information may indicate the resource occupied by the transmit beam for sending the uplink signal in the SRS resource set. For example, the SRS resource indication information may include identification information of the resource occupied by the transmit beam for sending the uplink signal in the SRS resource set where it lies. For example, for each SRS resource set, all the SRS resources included in the SRS resource set may be numbered, and the number of the SRS resource for sending the uplink signal in the SRS resource set where the SRS resource lies may be indicated by using SRS Resource Indicator (SRI).

For example, assuming that the user equipment is provided with 4 SRS resource sets, which are numbered 0, 1, 2, and 3, and each SRS resource set includes 8 SRS resources, which are numbered 0, 1, 2, 3, 4, 5, 6, and 7, when the SRSI indicates the number 2 and the SRI indicates the number 5, this means that the configuration unit 210 has configured a scanning beam corresponding to a SRS resource numbered 5 in an SRS resource set numbered 2 as the transmit beam for sending an uplink signal for the user equipment.

According to an embodiment of the present disclosure, the configuration information may include multiple sets of indication information, and each set of indication information includes one piece of SRS resource set indication information and one piece of SRS resource indication information. In this way, multiple transmit beams may be used for sending uplink signals.

Figure 4A:
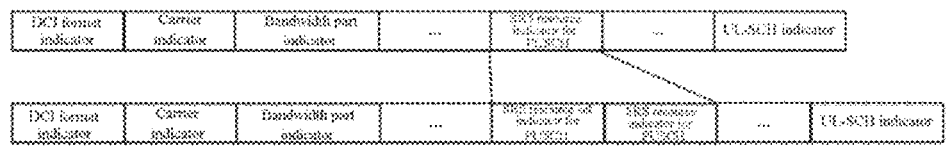
FIG. 4(a) is a schematic diagram showing configuration information indicating a transmit beam for sending an uplink data signal according to an embodiment of the present disclosure.

FIG. 4(a) is a schematic diagram showing configuration information indicating a transmit beam for sending an uplink data signal according to an embodiment of the present disclosure.

An upper part of FIG. 4(a) shows an indicator of an uplink transmit beam in DCI format 0_1 according to the conventional technology, and a lower part of FIG. 4(a) shows a modified DCI format according to an embodiment of the present disclosure. As shown in the upper part of FIG. 4(a), the DCI format 0_1 includes an SRS resource indicator for a PUSCH signal, which corresponds to the DCI indicator in FIG. 1, that is, the SRS resource indicator is used for indicating an SRS resource in the SRS resource set for CSI acquisition based on codebook or an SRS resource in the SRS resource set for CSI acquisition based on non-codebook. As shown in the lower part of FIG. 4(a), the DCI format may include an SRS resource set indicator for the PUSCH signal (such as the SRSI described above) and an SRS resource indicator for the PUSCH signal (such as the SRI described above).

Figure 4B:
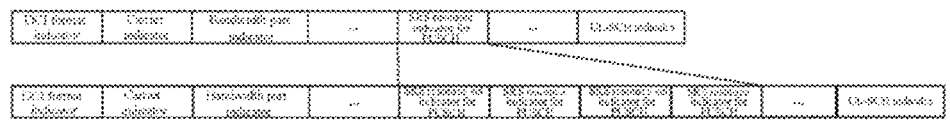
FIG. 4(b) is a schematic diagram showing configuration information indicating a transmit beam for sending an uplink data signal according to an embodiment of the present disclosure.

FIG. 4(b) is a schematic diagram showing configuration information indicating a transmit beam for sending an uplink data signal according to an embodiment of the present disclosure. Compared with FIG. 4(a), FIG. 4(b) includes two sets of indication information, each set of indication information includes an SRS resource set indicator for PUSCH signals and an SRS resource indicator for PUSCH signals. In addition, the structure of the DCI shown in FIG. 4(b) may also be extended to include more than three sets of indication information.

As described above, according to the embodiment of the present disclosure, the transmit beam for sending the uplink data signal may be indicated by using a combination of SRSI and SRI. In this way, information of the antenna panel where the transmit beam lies can be simply and clearly indicated.

An example of an indicator of a transmit beam for sending an uplink data signal according to another embodiment of the present disclosure will be described in detail in the following.

According to an embodiment of the present disclosure, the configuration information generated by the generation unit 220 may include an RRC parameter, to instruct the user equipment to send the uplink data signal using the transmit beam corresponding to the RRC parameter. That is, the RRC parameter has a correspondence to the transmit beam. For a certain RRC parameter, a unique transmit beam can be determined. Therefore, the network side equipment 200 may notify the user equipment of information of the transmit beam through the RRC parameter.

According to an embodiment of the present disclosure, the transmit beam corresponding to the RRC parameter represents a transmit beam used by an uplink signal corresponding to the RRC parameter. That is, the RRC parameter has a correspondence to the uplink signal. For a certain RRC parameter, a unique uplink signal can be determined. Specifically, if a certain RRC parameter is an RRC parameter for a certain uplink signal, it may be determined that the RRC parameter has a correspondence to the uplink signal.

According to an embodiment of the present disclosure, the uplink signal corresponding to the RRC parameter includes at least one of: an uplink data signal corresponding to the RRC parameter, an uplink control signal corresponding to the RRC parameter, and an uplink reference signal corresponding to the RRC parameter. Here, the uplink data signal may be, for example, a PUSCH signal, the uplink control signal may be, for example, a PUCCH signal, and the uplink reference signal may be, for example, an SRS.

Figure 5:
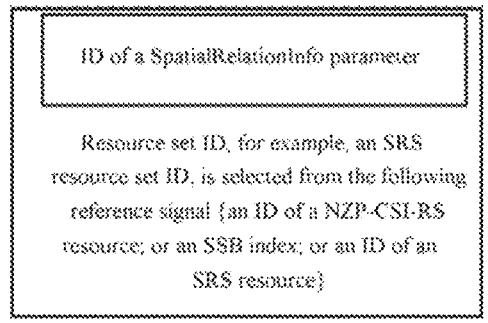
FIG. 5 is a schematic diagram showing a content of a SpatialRelationInfo parameter according to an embodiment of the present disclosure.

FIG. 5 is a schematic diagram showing a content of a SpatialRelationInfo parameter according to an embodiment of the present disclosure. The SpatialRelationInfo parameter here represents an RRC parameter for controlling a specific uplink signal (hereinafter referred to as an uplink signal A). As shown in FIG. 5, the SpatialRelationInfo parameter includes an ID, that is, identification information. In addition, the SpatialRelationInfo parameter also includes information of a transmit beam for sending an uplink signal corresponding to the SpatialRelationInfo parameter, that is, information of a transmit beam for sending the uplink signal A. For example, the transmit beam for sending the uplink signal A may be the same as a transmit beam or a receive beam of one of the following reference signals: Non Zero Power-Channel State information-Reference Signal (NZP-CSI-RS) on a designated resource; a designated Synchronization Signal Block (SSB); and SRS on a designated resource. Here, when a downlink reference signal is selected, such as the NZP-CSI-RS on a designated resource or the designated SSB, the uplink signal A is sent by using the receive beam for receiving the downlink reference signal; when an uplink reference signal is selected, for example, the SRS on a designated resource, the uplink signal A is sent by using the transmit beam for sending the uplink reference signal. In addition, the SpatialRelationInfo parameter according to the example of the present disclosure may also include a resource set ID, such as an SRS resource set ID, which is used to indicate an SRS resource set (that is, an antenna panel) where the transmit beam for sending the uplink signal A lies.

According to an embodiment of the present disclosure, the uplink signal A may be an uplink signal that has been sent, and the uplink signal A may include any one of a PUSCH signal, a PUCCH signal, and an SRS. That is, the SpatialRelationInfo parameter shown in FIG. 5 may be a SpatialRelationInfo parameter corresponding to the PUSCH signal, a SpatialRelationInfo parameter corresponding to the PUCCH signal, or a SpatialRelationInfo parameter corresponding to the SRS.

According to the embodiment of the present disclosure, all SpatialRelationInfo parameters corresponding to the uplink signals that have been sent may be numbered, so that each SpatialRelationInfo parameter has information of a unique ID. If the configuration information generated by the generation unit 220 includes the SpatialRelationInfo parameter corresponding to the uplink signal A, it indicates that a transmit beam for sending an uplink signal (referred to as an uplink signal B) is the same as the transmit beam for sending the uplink signal A. Here, the uplink signal B indicates an uplink signal to be sent. Actually, according to the embodiment of the present disclosure, the transmit beam for sending the uplink signal A that has been sent may be related to the transmit beam for sending the uplink signal B to be sent through a numbered RRC parameter, so that the user equipment can know the transmit beam for sending the uplink signal B. Here, the uplink signal B can only be a data signal, and the uplink signal A may be any uplink signal.

FIGS. 6(a) to 6(e) are schematic diagrams each showing configuration information indicating a transmit beam for sending an uplink data signal according to an embodiment of the present disclosure.

Figure 6A:
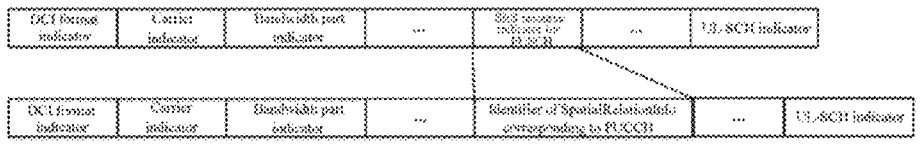
FIG. 6(a) is a schematic diagram showing configuration information indicating a transmit beam for sending an uplink data signal according to an embodiment of the present disclosure.

An upper part of FIG. 6(a) shows an indicator of an uplink transmit beam in DCI format 0_1 according to the conventional technology, and a lower part shows a modified DCI format according to an embodiment of the present disclosure. As shown in the upper part of FIG. 6(a), the DCI format 0_1 includes an SRS resource indicator for a PUSCH signal, which corresponds to the DCI indicator in FIG. 1, that is, the SRS resource indicator is used for indicating an SRS resource in an SRS resource set for CSI acquisition based on codebook or an SRS resource in an SRS resource set for CSI acquisition based on non-codebook. As shown in the lower part of FIG. 6(a), the DCI format may include an identifier of a SpatialRelationInfo parameter corresponding to the PUCCH signal. That is, a transmit beam for sending a PUSCH signal to be sent by the user equipment may be the same as a transmit beam for sending the PUCCH signal corresponding to the SpatialRelationInfo parameter.

Figure 6B:
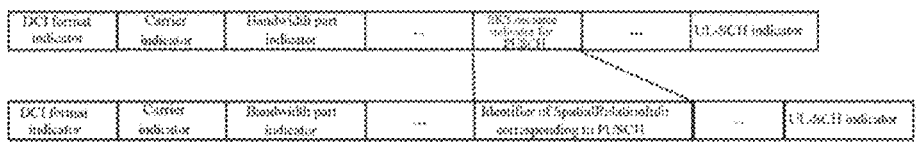
FIG. 6(b) is a schematic diagram showing configuration information indicating a transmit beam for sending an uplink data signal according to an embodiment of the present disclosure.

FIG. 6(b) shows an example of using the SpatialRelationInfo parameter corresponding to the PUSCH signal. As shown in a lower part of FIG. 6(b), the DCI format may include the identifier of the SpatialRelationInfo parameter corresponding to the PUSCH signal. That is, the transmit beam for sending the PUSCH signal to be sent by the user equipment may be the same as the transmit beam for sending the PUSCH signal corresponding to the SpatialRelationInfo parameter.

Figure 6C:
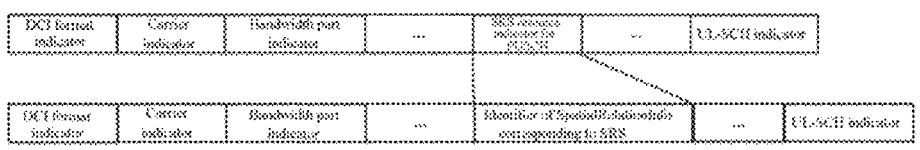
FIG. 6(c) is a schematic diagram showing configuration information indicating a transmit beam for sending an uplink data signal according to an embodiment of the present disclosure.

FIG. 6(c) shows an example of using a SpatialRelationInfo parameter corresponding to SRS. As shown in a lower part of FIG. 6(c), the DCI format may include an identifier of the SpatialRelationInfo parameter corresponding to the SRS. That is, the transmit beam for sending the PUSCH signal to be sent by the user equipment may be the same as a transmit beam for sending the SRS corresponding to the SpatialRelationInfo parameter.

As described above, according to an embodiment of the present disclosure, the configuration unit 210 may configure one or more transmit beams for sending uplink signals. That is, the configuration information may include one or more RRC parameters as described above to indicate multiple transmit beams respectively.

Figure 6D:
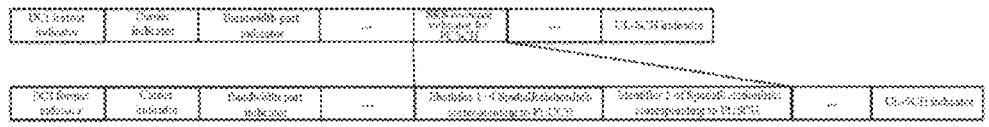
FIG. 6(d) is a schematic diagram showing configuration information indicating a transmit beam for sending an uplink data signal according to an embodiment of the present disclosure.
Figure 6E:
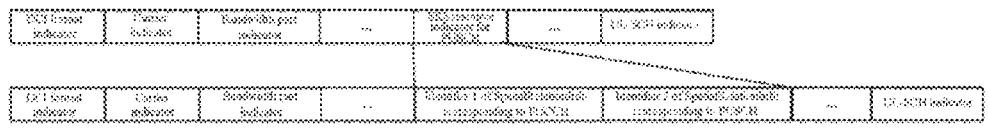
FIG. 6(e) is a schematic diagram showing configuration information indicating a transmit beam for sending an uplink data signal according to an embodiment of the present disclosure.

FIG. 6(d) and FIG. 6(e) each shows a schematic diagram of configuration information corresponding to multiple transmit beams.

As shown in a lower part of FIG. 6(d), the DCI format may include identifiers of two SpatialRelationInfo parameters corresponding to the PUCCH signal. That is, there are two transmit beams for sending the PUSCH signal to be sent by the user equipment, the first transmit beam is the same as a transmit beam for sending the PUCCH signal corresponding to the SpatialRelationInfo parameter identified by the identifier 1, and the second transmit beam is the same as a transmit beam for sending the PUCCH signal corresponding to the SpatialRelationInfo parameter identified by the identifier 2.

As shown in a lower part of FIG. 6(e), the DCI format may include an identifier of the SpatialRelationInfo parameter corresponding to the PUCCH signal and an identifier of the SpatialRelationInfo parameter corresponding to the PUSCH signal. That is, there are two transmit beams for sending the PUSCH signal to be sent by the user equipment, the first transmit beam is the same as a transmit beam for sending the PUCCH signal corresponding to the SpatialRelationInfo parameter identified by the identifier 1, and the second transmit beam is the same as a transmit beam for sending the PUSCH signal corresponding to the SpatialRelationInfo parameter identified by the identifier 2. In addition, a structure of the DCI shown in FIG. 6(d) and FIG. 6(e) may also include configuration information of three or more transmit beams.

As described above, an uplink data signal to be sent may be related to the uplink signal that has been sent through the SpatialRelationInfo parameter, so that the uplink data signal to be sent may be sent by using the same transmit beam as the transmit beam for sending the uplink signal that has been sent. Here, since the user equipment knows which transmit beam on which antenna panel is used for sending the uplink signal that has been sent, information of the SpatialRelationInfo parameter actually implicitly includes information of the antenna panel. Thus, even if the user equipment is provided with multiple antenna panels, the network side equipment 200 can also notify the user equipment of information of the configured transmit beam.

According to an embodiment of the present disclosure, the configuration unit 210 may identify multiple transmit beams on multiple antenna panels of the user equipment based on a beam scanning process of the user equipment. That is, the configuration unit 210 may configure a transmit beam for sending an uplink data signal for the user equipment based on the uplink beam scanning process of the user equipment. That is, the transmit beam for sending an uplink data signal configured for the user equipment is used for beam management.

Figure 7:
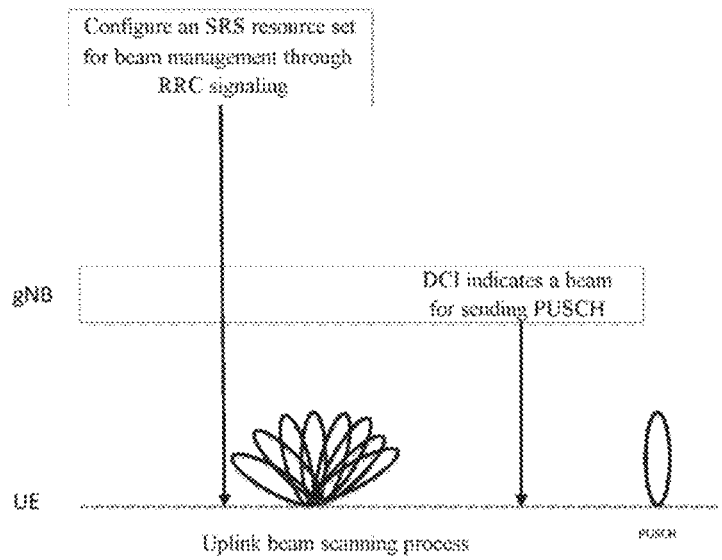
FIG. 7 is a schematic diagram showing a process of selecting a transmit beam for sending an uplink data signal according to an embodiment of the present disclosure.

FIG. 7 is a schematic diagram showing a process of selecting a transmit beam for sending an uplink data signal according to an embodiment of the present disclosure. As shown in FIG. 7, first, a gNB configures an SRS resource set for beam management for the UE through RRC signaling. Next, the UE may perform an uplink beam scanning process based on a configuration of the gNB. Next, based on the uplink beam scanning process of the UE, the gNB may notify the UE of the selected transmit beam for sending the uplink signal through DCI signaling. Next, the UE may perform uplink data transmission by using a beam corresponding to the SRS resource indicated by the gNB, that is, sending a PUSCH signal. Here, the gNB may generate the configuration information in the DCI signaling through any of the methods described above, which is not repeated here.

As shown in FIG. 7, according to the embodiment of the present disclosure, the gNB only needs to perform RRC configuration once to select the uplink transmit beam, thereby saving signaling overhead, avoiding unnecessary RRC reconfiguration, thus reducing system delay. Further, the step of activation through the MAC CE is omitted in FIG. 7, which further reduces the overhead. In addition, the transmit beam for sending the uplink signal is selected by the gNB based on the uplink beam scanning process of the UE, so the configuration information carries the information of the antenna panel of the UE. Therefore, with the network side equipment 200 according to the embodiment of the present disclosure, the process of determining the uplink transmit beam can be optimized.

Figure 8:
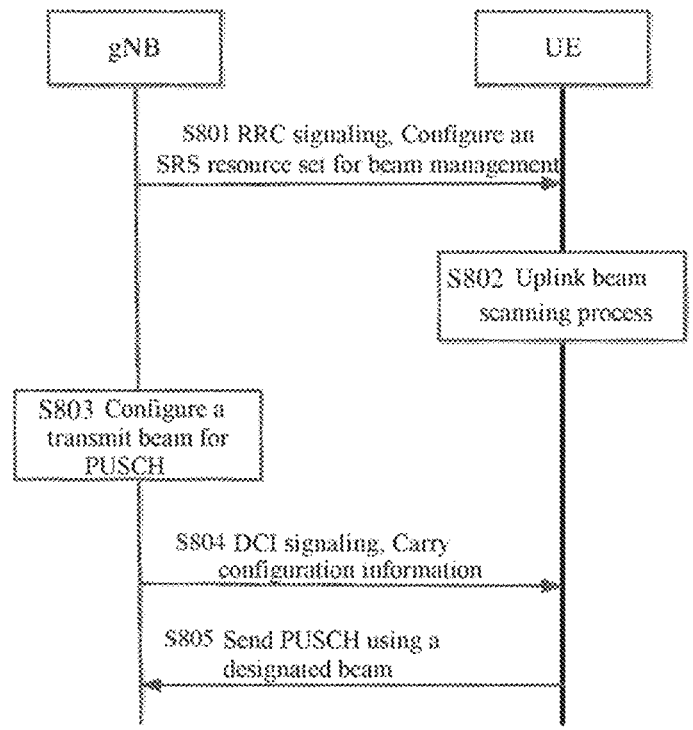
FIG. 8 is a flow chart of signaling for selecting a transmit beam for sending an uplink data signal according to an embodiment of the present disclosure.

FIG. 8 is a flow chart showing signaling for selecting a transmit beam for sending an uplink data signal according to an embodiment of the present disclosure. As shown in FIG. 8, in step S801, a gNB configures an SRS resource set for beam management for a UE through RRC signaling. Next, in step S802, the UE performs an uplink beam scanning process based on the configuration of the gNB. Next, in step S803, the gNB configures a transmit beam for sending a PUSCH signal. Next, in step S804, the gNB sends configuration information to the UE through DCI signaling to indicate the transmit beam for sending the PUSCH signal. Next, in step S805, the UE sends the PUSCH signal using the transmit beam designated by the gNB.

For the Uplink Control Signal (a PUCCH Signal)

Similar to the uplink data signal, if the uplink signal is a PUCCH signal, according to an embodiment of the present disclosure, the configuration information generated by the generation unit 220 may include SRS resource set indication information and SRS resource indication information. The SRS resource set indication information may indicate an SRS resource set where a transmit beam for sending an uplink signal lies. The SRS resource indication information may indicate a resource occupied by the transmit beam for sending the uplink signal in the SRS resource set.

According to an embodiment of the present disclosure, an RRC parameter may be modified so that the network side equipment 200 can notify the user equipment of the transmit beam for sending the PUCCH signal. Specifically, the PUCCH-SpatialRelationInfo (that is, the SpatialRelationInfo parameter for controlling the PUCCH signal) in the RRC parameters may be modified as follows:

```
PUCCH-SpatialRelationInfo::=    SEQUENCE{
pucch-SpatialRelationInfoId     PUCCH-SpatialRelationInfoId,
...
srs                             SEQUENCE{
                                resource      srs-ResourceId,
                                resource-set  srs-Resource-Set-Id,
...
}
...
}
```

As described above, PUCCH-SpatialRelationInfold represents identification information of an RRC parameter PUCCH-SpatialRelationInfo, that is, an ID, and srs-ResourceId represents identification information of an SRS resource of a transmit beam for sending a PUCCH signal. According to the embodiment of the present disclosure, the identification information of the SRS resource set, that is, srs-Resource-Set-Id, is added to the above RRC parameter, so that the network side equipment 200 can consider information of the antenna panel while notifying the user equipment of the transmit beam for sending the PUCCH signal.

According to an embodiment of the present disclosure, for the case that the uplink signal is a PUCCH signal, the transmit beam for sending an uplink signal configured by the configuration unit 210 may also include one or more transmit beams. In the case that the transmit beam for sending the uplink control signal includes multiple transmit beams, the parameters srs-ResourceId and srs-Resource-Set-Id in the above example may be extended to multiple parameters.

If the uplink signal is a PUCCH signal, according to another embodiment of the present disclosure, the configuration information generated by the generation unit 220 may include a downlink reference signal indicator (that is, a CSI-RS resource indicator or an SSB resource indicator) and an SRS resource set indicator information. The SRS resource set indication information may indicate an antenna panel of a receive beam for receiving a downlink signal. The CSI-RS resource indication information may indicate that a beam for receiving a downlink reference signal CSI-RS is used as a PUCCH transmit beam. The SSB resource indicator may indicate that a beam for receiving a downlink reference signal SSB is used as a PUCCH transmit beam.

According to the embodiment of the present disclosure, an RRC parameter may be modified so that the network side equipment 200 can notify the user equipment of the transmit beam for sending the PUCCH signal. Specifically, the PUCCH-SpatialRelationInfo (that is, the SpatialRelationInfo parameter for controlling the PUCCH signal) in the RRC parameter may be modified as follows:

```
PUCCH-SpatialRelationInfo::=   SEQUENCE
pucch-SpatialRelationInfoId    PUCCH-SpatialRelationInfoId,
...
resource-set                   srs-Resource-Set-Id,   Optional
referencesignal                Choice{
                               ssb-Index      SSB-Index,
                               csi-RS-Index   NZP-CSI-RS-ResourceId,
...
}
...
}
```

As described above, PUCCH-SpatialRelationInfold represents identification information of an RRC parameter PUCCH-SpatialRelationInfo, that is, an ID, SSB-Index or NZP-CSI-RS-ResourceId represents SSB or NZP-CSI-RS resource identification information for notifying the user equipment to select a corresponding receive beam of SSB or NZP-CSI-RS as the transmit beam for sending the PUCCH signal. According to the embodiment of the present disclosure, the identification information of the SRS resource set, that is, srs-Resource-Set-Id, is added to the above RRC parameter, so that the network side equipment 200 can consider information of an antenna panel while notifying the user equipment of the transmit beam for sending the PUCCH signal.

For the Uplink Reference Signal (SRS)

Similar to the uplink data signal, if the uplink signal is an SRS, according to an embodiment of the present disclosure, the configuration information generated by the generation unit 220 may include SRS resource set indication information and SRS resource indication information. The SRS resource set indication information may indicate an SRS resource set where a transmit beam for sending an uplink signal lies. The SRS resource indication information may indicate a resource occupied by the transmit beam for sending the uplink signal in the SRS resource set.

According to an embodiment of the present disclosure, an RRC parameter may be modified so that the network side equipment 200 can notify the user equipment of a transmit beam for sending the SRS. Specifically, the SRS SpatialRelationInfo in the RRC parameter may be modified as follows:

```
SRS-SpatialRelationInfo::=    SEQUENCE{
...
srs                SEQUENCE{
                   resourceId      srs-ResourceId,
                   resourcesetId   srs-Resource-Set-Id,
...
}
...
}
```

As described above, srs-ResourceId represents SRS resource identification information of the transmit beam for sending the SRS. According to the embodiment of the present disclosure, the identification information of the SRS resource set, that is, srs-Resource-Set-Id, is added to the above RRC parameter, so that the network side equipment 200 can consider information of an antenna panel while notifying the user equipment of the transmit beam for sending the SRS.

According to an embodiment of the present disclosure, for a case where the uplink signal is an SRS, the transmit beam for sending the uplink signal configured by the configuration unit 210 may also include one or more transmit beams. In the case that the transmit beam for sending the SRS includes multiple transmit beams, the parameters srs-ResourceId and srs-Resource-Set-Id in the above example may be extended to multiple parameters.

Similar to the uplink data signal, if the uplink signal is an SRS, according to another embodiment of the present disclosure, the configuration information generated by the generation unit 220 may include a downlink reference signal (that is, a CSI-RS resource indicator or a SSB resource indicator) and SRS resource set indication information. The SRS resource set indication information may indicate an antenna panel of a receive beam for receiving a downlink signal. The CSI-RS resource indication information may indicate that a beam for receiving the downlink reference signal CSI-RS is used as a transmit beam for sending the SRS. The SSB resource indicator may indicate that a beam for receiving the downlink reference signal SSB is used as the transmit beam for sending the SRS.

According to an embodiment of the present disclosure, an RRC parameter may be modified so that the network side equipment 200 can notify the user equipment of the transmit beam for sending the SRS. Specifically, the SRS SpatialRelationInfo in the RRC parameter may be modified as follows:

```
SRS-SpatialRelationInfo::=    SEQUENCE{
...
resource-set       srs-Resource-Set-Id,    Optional
referencesignal    Choice{
                   ssb-Index      SSB-Index,
                   csi-RS-Index   NZP-CSI-RS-ResourceId,
...
}
...
}
```

As described above, SSB-Index or NZP-CSI-RS-ResourceId represents SSB or NZP-CSI-RS resource identification information for notifying the user equipment to select a corresponding receive beam of SSB or NZP-CSI-RS as a transmit beam for sending the SRS signal. According to the embodiment of the present disclosure, the identification information of the SRS resource set, that is, srs-Resource-Set-Id, is added to the above RRC parameter, so that the network side equipment 200 can consider information of an antenna panel while notifying the user equipment of the transmit beam for sending the SRS signal.

As described above, according to the embodiment of the present disclosure, regardless of whether the uplink signal to be sent by the user equipment is a data signal, a control signal or a reference signal, the transmit beam configured by the configuration unit 210 may be characterized by a combination of SRS resource set indication information and SRS resource indication information, so that the user equipment can determine a specific transmit beam on a specific antenna panel to send an uplink signal. In addition, if the uplink signal to be sent by the user equipment is a data signal, the transmit beam configured by the configuration unit 210 may also be characterized by an RRC parameter, so that the user equipment can determine the transmit beam corresponding to the RRC parameter and determine a specific transmit beam on a specific antenna panel to send the uplink data signal. Therefore, with the network side equipment 200 according to the embodiment of the present disclosure, the generated configuration information carries the information of the antenna panel of the user equipment, such that the process of determining the uplink transmit beam can be optimized.

3. Configuration Example of the User Equipment

Figure 9:
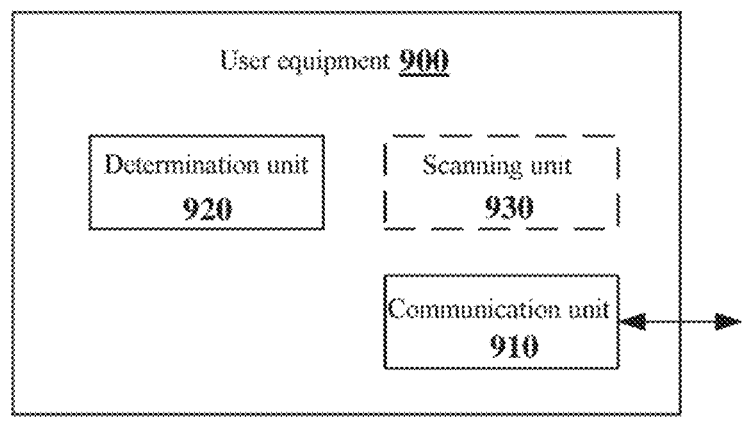
FIG. 9 is a block diagram showing an example of a configuration of a user equipment according to an embodiment of the present disclosure.

FIG. 9 is a block diagram showing a structure of a user equipment 900 in a wireless communication system according to an embodiment of the present disclosure. As shown in FIG. 9, the user equipment 900 may include a communication unit 910 and a determination unit 920.

Here, each unit of the user equipment 900 may be included in a processing circuit. It should be noted that the user equipment 900 may include one processing circuit or multiple processing circuits. Further, the processing circuit may include various discrete functional units to perform various different functions and/or operations. It should be noted that these functional units may be physical entities or logical entities, and units with different names may be implemented by the same physical entity.

According to an embodiment of the present disclosure, the communication unit 910 may receive configuration information indicating a transmit beam for sending an uplink signal.

According to an embodiment of the present disclosure, the determination unit 920 may determine the transmit beam for sending the uplink signal from among multiple transmit beams on multiple antenna panels of the user equipment based on the configuration information received by the communication unit 910.

According to the embodiment of the present disclosure, the multiple antenna panels of the user equipment are in one-to-one correspondence to multiple SRS resource sets, and beams on each antenna panel are in one-to-one correspondence to SRS resources in a SRS resource set corresponding to the antenna panel.

According to an embodiment of the present disclosure, the communication unit 910 may receive configuration information through high layer signaling. The high layer signaling includes, but is not limited to, RRC signaling. Further, the determination unit 920 may determine a transmit beam for sending an uplink non-data signal based on the configuration information.

Here, the uplink non-data signal may include an uplink reference signal and an uplink control signal. The uplink control signal includes a PUCCH signal, and the uplink reference signal includes an SRS.

According to an embodiment of the present disclosure, the communication unit 910 may receive configuration information through low layer signaling. The low layer signaling includes, but is not limited to, DCI signaling. Further, the determination unit 920 may determine a transmit beam for sending an uplink data signal, for example, the PUSCH signal, based on the configuration information.

According to an embodiment of the present disclosure, the transmit beam for sending the uplink signal determined by the determination unit 920 may include one or more transmit beams.

An example of the determination unit 920 according to an embodiment of the present disclosure is described in detail below with respect to a data signal, a control signal, and a reference signal, respectively.

For the Uplink Data Signal (a PUSCH Signal)

According to an embodiment of the present disclosure, the determination unit 920 may determine SRS resource set indication information and SRS resource indication information based on configuration information.

Further, according to an embodiment of the present disclosure, the determination unit 920 may determine an SRS resource set where the transmit beam for sending the uplink signal lies according to the SRS resource set indication information, and determine the transmit beam for sending the uplink signal from the SRS resource set where the transmit beam lies based on the SRS resource indication information.

For example, the determination unit 920 may determine the identification information of the SRS resource set where the transmit beam for sending the uplink signal lies based on the SRS resource set indication information. For example, the determination unit 920 may determine the number of the SRS resource set for sending the uplink signal based on the SRSI. Further, the determination unit 920 may determine the identification information of the transmit beam for sending the uplink signal in the SRS resource set where the transmit beam lies based on the SRS resource indication information. For example, the number of the SRS resource for sending the uplink signal in the SRS resource set where the SRS resource lies is determined based on the SRI.

According to an embodiment of the present disclosure, the determination unit 920 may determine multiple sets of indication information based on the configuration information, and each set of indication information includes one piece of SRS resource set indication information and one piece of SRS resource indication information.

As described above, the determination unit 920 may determine one or more sets of indication information based on the configuration information, and each set of indication information includes SRS resource set indication information and SRS resource indication information. Therefore, the determination unit 920 may determine one or more transmit beams for sending the uplink data signal.

According to an embodiment of the present disclosure, the determination unit 920 may determine, based on the RRC parameter included in the configuration information, a transmit beam corresponding to the RRC parameter as the transmit beam for sending the uplink signal. For example, the RRC parameter may be the SpatialRelationInfo parameter described above.

According to an embodiment of the present disclosure, the transmit beam corresponding to the RRC parameter represents a transmit beam for sending an uplink signal corresponding to the RRC parameter. Here, the uplink signal corresponding to the RRC parameter includes at least one of the following: an uplink data signal corresponding to the RRC parameter, an uplink control signal corresponding to the RRC parameter, and an uplink reference signal corresponding to the RRC parameter.

According to an embodiment of the present disclosure, the determination unit 920 may determine one or more transmit beams for sending uplink data signals based on one or more RRC parameters included in the configuration information.

According to an embodiment of the present disclosure, as shown in FIG. 9, the user equipment 900 may further include a scanning unit 930, which is configured to perform an uplink beam scanning process, for the network side equipment to identify multiple transmit beams on multiple antenna panels of the user equipment 900.

As described above, after the determination unit 920 determines one or more transmit beams for sending uplink data signal, the user equipment 900 may send the uplink data signal, that is, the PUSCH signal, by using the determined transmit beams.

For the Uplink Control Signal (a PUCCH Signal)

Similar to the PUSCH signal, according to an embodiment of the present disclosure, the determination unit 920 may determine SRS resource set indication information and SRS resource indication information based on the configuration information. Further, the determination unit 920 may determine an SRS resource set where a transmit beam for sending the uplink control signal lies based on the SRS resource set indication information, and determine a transmit beam for sending the PUCCH signal from an SRS resource set where the transmit beam lies based on the SRS resource indication information.

According to an embodiment of the present disclosure, the determination unit 920 may determine multiple sets of indication information based on the configuration information, and each set of indication information includes one piece of SRS resource set indication information and one piece of SRS resource indication information.

After the determination unit 920 determines one or more transmit beams for sending the PUCCH signal, the user equipment 900 may send the PUCCH signal using the determined transmit beam.

For the Uplink Reference Signal (an SRS)

Similar to the PUSCH signal, according to an embodiment of the present disclosure, the determination unit 920 may determine SRS resource set indication information and SRS resource indication information based on the configuration information. Further, the determination unit 920 may determine, based on the SRS resource set indication information, an SRS resource set where a transmit beam for sending the uplink reference signal lies, and determine a transmit beam for sending the SRS from the SRS resource set where the transmit beam lies based on the SRS resource indication information.

According to an embodiment of the present disclosure, the determination unit 920 may determine multiple sets of indication information based on the configuration information, and each set of indication information includes one piece of SRS resource set indication information and one piece of SRS resource indication information.

After the determination unit 920 determines one or more transmit beams for sending the SRS, the user equipment 900 may send the SRS using the determined transmit beam.

As described above, according to the embodiment of the present disclosure, regardless of whether the uplink signal to be sent by the user equipment is a data signal, a control signal, or a reference signal, a specific transmit beam on a specific antenna panel may be determined by a combination of the SRS resource set indication information and the SRS resource indication information. In addition, if the uplink signal to be sent by the user equipment is a data signal, a transmit beam corresponding to an RRC parameter may also be determined based on the RRC parameter, and the specific transmit beam on the specific antenna panel is determined. Therefore, with the user equipment 900 according to the embodiment of the present disclosure, the received configuration information carries the information of the antenna panel of the user equipment 900, so that the process of determining the uplink transmit beam can be optimized.

The network side equipment 200 according to an embodiment of the present disclosure may provide a service for the user equipment 900, so all the embodiments regarding the network side equipment 200 described in the foregoing are applicable to herein.

4. Method Embodiment

Next, a wireless communication method performed by the network side equipment 200 in a wireless communication system according to an embodiment of the present disclosure is described in detail.

Figure 10:
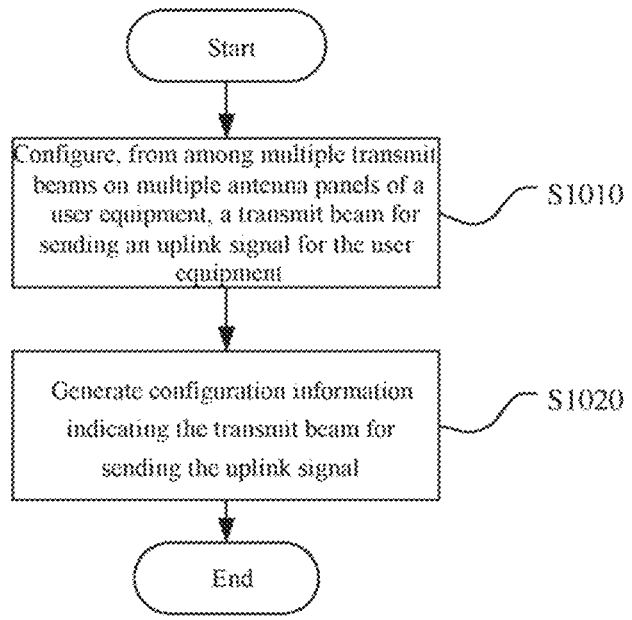
FIG. 10 is a flowchart showing a wireless communication method performed by a network side equipment according to an embodiment of the present disclosure.

FIG. 10 is a flowchart showing a wireless communication method performed by the network side equipment 200 in a wireless communication system according to an embodiment of the present disclosure.

As shown in FIG. 10, in step S1010, the user equipment is configured with a transmit beam for sending an uplink signal from among multiple transmit beams on multiple antenna panels of the user equipment.

Next, in step S1020, configuration information is generated, and the configuration information indicates the transmit beam for sending the uplink signal.

Preferably, the multiple antenna panels of the user equipment are in one-to-one correspondence to multiple SRS resource sets, and one or more transmit beams on each antenna panel are in one-to-one correspondence to SRS resources in an SRS resource set corresponding to the antenna panel.

Preferably, the configuration information includes SRS resource set indication information and SRS resource indication information.

Preferably, the SRS resource set indication information indicates an SRS resource set where the transmit beam for sending the uplink signal lies, and the SRS resource indication information indicates a resource occupied by the transmit beam for sending the uplink signal in the SRS resource set.

Preferably, the configuration information includes an RRC parameter, to instruct the user equipment to send the uplink signal using a transmit beam corresponding to the RRC parameter.

Preferably, the transmit beam corresponding to the RRC parameter represents a transmit beam used by an uplink signal corresponding to the RRC parameter.

Preferably, the uplink signal corresponding to the RRC parameter includes at least one of: an uplink data signal corresponding to the RRC parameter, an uplink control signal corresponding to the RRC parameter, and an uplink reference signal corresponding to the RRC parameter.

Preferably, the uplink signal includes a non-data signal, and the wireless communication method further includes: sending the configuration information to the user equipment through high layer signaling.

Preferably, the non-data signal includes an uplink reference signal and an uplink control signal.

Preferably, the uplink signal includes a data signal, and the wireless communication method further includes: sending the configuration information to the user equipment through low layer signaling.

Preferably, the wireless communication method further includes: identifying the multiple transmit beams on the multiple antenna panels of the user equipment based on a beam scanning process of the user equipment.

Preferably, the transmit beam for sending the uplink signal includes one or more transmit beams.

According to the embodiment of the present disclosure, a subject that performs the above method may be the network side equipment 200 according to the embodiment of the present disclosure, so all the embodiments regarding the network side equipment 200 described above are applicable to herein.

Next, a wireless communication method performed by the user equipment 900 in a wireless communication system according to an embodiment of the present disclosure is described in detail.

Figure 11:
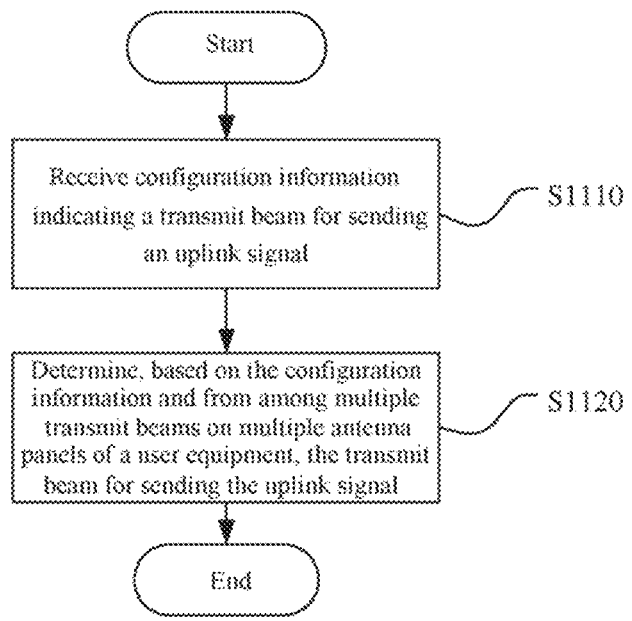
FIG. 11 is a flowchart showing a wireless communication method performed by a user equipment according to an embodiment of the present disclosure.

FIG. 11 is a flowchart showing a wireless communication method performed by the user equipment 900 in a wireless communication system according to an embodiment of the present disclosure.

As shown in FIG. 11, in step S1110, configuration information indicating a transmit beam for sending an uplink signal is received.

Next, in step S1120, the transmit beam for sending the uplink signal is determined from among multiple transmit beams on multiple antenna panels of the user equipment based on the configuration information.

Preferably, the multiple antenna panels of the user equipment are in one-to-one correspondence to multiple SRS resource sets, and one or more transmit beams on each antenna panel are in one-to-one correspondence to SRS resources in an SRS resource set corresponding to the antenna panel.

Preferably, the wireless communication method further includes: determining SRS resource set indication information and SRS resource indication information based on the configuration information.

Preferably, the wireless communication method further includes: determining, based on the SRS resource set indication information, an SRS resource set where the transmit beam for sending the uplink signal lies; and determining the transmit beam for sending the uplink signal from the SRS resource set based on the SRS resource indication information.

Preferably, the wireless communication method further includes: determining, based on an RRC parameter included in the configuration information, a transmit beam corresponding to the RRC parameter as the transmit beam for sending the uplink signal.

Preferably, the transmit beam corresponding to the RRC parameter represents a transmit beam used by an uplink signal corresponding to the RRC parameter.

Preferably, the uplink signal corresponding to the RRC parameter includes at least one of: an uplink data signal corresponding to the RRC parameter, an uplink control signal corresponding to the RRC parameter, and an uplink reference signal corresponding to the RRC parameter.

Preferably, the receiving the configuration information includes: receiving the configuration information through high layer signaling, and the wireless communication method further includes: determining a transmit beam for sending an uplink non-data signal based on the configuration information.

Preferably, the uplink non-data signal includes an uplink reference signal and an uplink control signal.

Preferably, the receiving the configuration information includes: receiving the configuration information through low layer signaling, and the wireless communication method further includes: determining a transmit beam for sending the uplink data signal based on the configuration information.

Preferably, the wireless communication method further includes: performing an uplink beam scanning process for the network side equipment to identify the multiple transmit beams on the multiple antenna panels of the user equipment.

Preferably, the determining the transmit beam for sending the uplink signal includes: determining one or more transmit beams for sending the uplink signal.

According to an embodiment of the present disclosure, a subject that performs the above method may be the user equipment 900 according to the embodiment of the present disclosure, so all the embodiments regarding the user equipment 900 described above are applicable to herein.

5. Application Example

The technology of the present disclosure may be applied to various products.

For example, the network side equipment may be implemented as any type of TRP. The TRP may have sending and receiving functions, for example, the TRP may receive information from a user equipment and a base station device, and may also send information to the user equipment and the base station device. In a typical example, the TRP may provide services for the user equipment and is controlled by the base station device. Further, the TRP may have a structure similar to that of the base station device described below, or may only have a structure related to the transmission and reception of information in the base station device.

The network side equipment may also be implemented as any type of base station device, such as a macro eNB and a small eNB, and may also be implemented as any type of gNB. A small eNB may be an eNB that covers a cell smaller than a macro cell, such as a pico eNB, a micro eNB, and a home (femto) eNB. Instead, the base station may be implemented as any other type of base station, such as an NodeB and a base transceiver station (BTS). The base station may include: a main body (also referred to as a base station device) configured to control wireless communications; and one or more remote radio heads (RRH) arranged in a different places from the main body.

The user equipment may be implemented as a mobile terminal (such as a smart phone, a tablet personal computer (PC), a notebook PC, a portable game terminal, a portable/dongle type mobile router, and a digital camera) or an in-vehicle terminal (such as a car navigation device). The user equipment may also be implemented as a terminal (also referred to as a machine type communication (MTC) terminal) that performs machine-to-machine (M2M) communication. In addition, the user equipment may be a wireless communication module (such as an integrated circuit module including a single chip) installed on each of the above user equipment.

Application Examples of the Base Station

First Application Example

Figure 12:
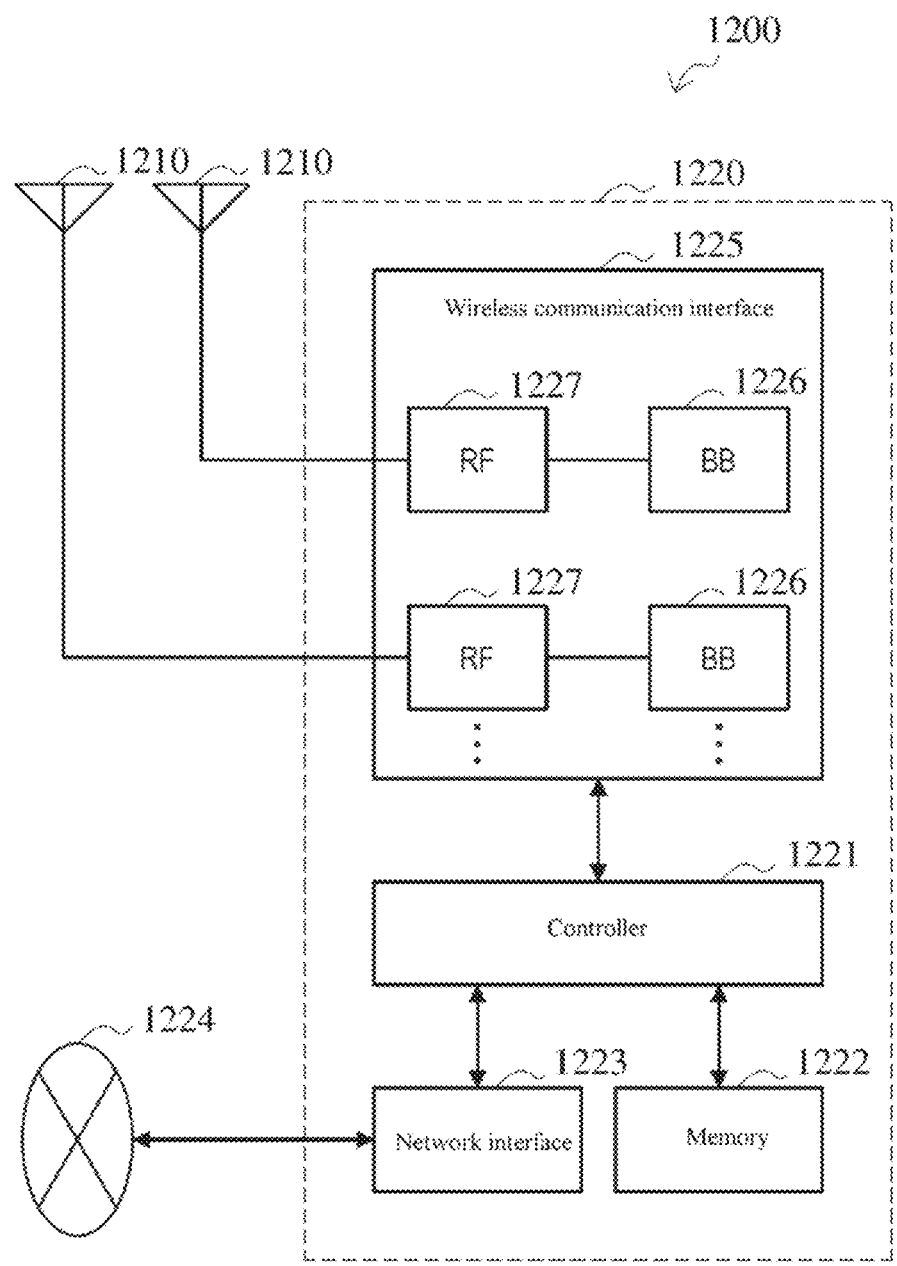
FIG. 12 is a block diagram showing a first example of a schematic configuration of gNB (a base station device in a 5G communication system)

FIG. 12 is a block diagram showing a first example of a schematic configuration of a gNB to which the technology of the present disclosure may be applied. The gNB 1200 includes one or more antennas 1210 and a base station device 1220. The base station device 1220 and each antenna 1210 may be connected to each other via an RF cable.

Each of the antennas 1210 includes a single or multiple antenna elements (such as multiple antenna elements included in a multiple-input multiple-output (MIMO) antenna), and is used for the base station device 1220 to transmit and receive wireless signals. As shown in FIG. 12, the gNB 1200 may include multiple antennas 1210. For example, the multiple antennas 1210 may be compatible with multiple frequency bands used by the gNB 1200. Although FIG. 12 shows an example in which the gNB 1200 includes multiple antennas 1210, the gNB 1200 may also include a single antenna 1210.

The base station device 1220 includes a controller 1221, a memory 1222, a network interface 1223, and a wireless communication interface 1225.

The controller 1221 may be, for example, a CPU or a DSP, and operates various functions of higher layers of the base station device 1220. For example, the controller 1221 generates a data packet based on data in a signal processed by the wireless communication interface 1225, and transmits the generated packet via the network interface 1223. The controller 1221 may bundle data from multiple baseband processors to generate a bundled packet, and transfer the generated bundled packet. The controller 1221 may have a logic function for performing control such as radio resource control, radio bearer control, mobility management, admission control, and scheduling. This control may be performed in conjunction with nearby gNB or core network nodes. The memory 1222 includes an RAM and an ROM, and stores programs executed by the controller 1221 and various types of control data (such as a terminal list, transmission power data, and scheduling data).

The network interface 1223 is a communication interface for connecting the base station device 1220 to the core network 1224. The controller 1221 may communicate with the core network node or another gNB via the network interface 1223. In this case, the gNB 1200 may be connected to the core network node or the other gNB through logical interfaces (such as an Si interface and an X2 interface). The network interface 1223 may also be a wired communication interface or a wireless communication interface for a wireless backhaul line. If the network interface 1223 is a wireless communication interface, the network interface 1223 may use a higher frequency band for wireless communication than the frequency band used by the wireless communication interface 1225.

The wireless communication interface 1225 supports any cellular communication scheme (such as Long Term Evolution (LTE) and LTE-Advanced), and provides wireless connection to a terminal located in the cell of the gNB 1200 via the antenna 1210. The wireless communication interface 1225 may generally include, for example, a baseband (BB) processor 1226 and an RF circuit 1227. The BB processor 1226 may perform, for example, encoding/decoding, modulation/demodulation, and multiplexing/demultiplexing, and perform various types of signal processing of layers (such as L1, medium access control (MAC), radio link control (RLC), and packet data convergence protocol (PDCP)). Instead of the controller 1221, the BB processor 1226 may have a part or all of the above logical functions. The BB processor 1226 may be a memory storing a communication control program, or a module including a processor and related circuits configured to execute the program. The updating the program may change the function of the BB processor 1226. The module may be a card or a blade inserted into the slot of the base station device 1220. Alternatively, the module may also be a chip mounted on a card or a blade. In addition, the RF circuit 1227 may include, for example, a frequency mixer, a filter, and an amplifier, and transmit and receive wireless signals via the antenna 1210.

As shown in FIG. 12, the wireless communication interface 1225 may include multiple BB processors 1226. For example, the multiple BB processors 1226 may be compatible with multiple frequency bands used by the gNB 1200. As shown in FIG. 12, the wireless communication interface 1225 may include multiple RF circuits 1227. For example, the multiple RF circuits 1227 may be compatible with multiple antenna elements. Although FIG. 12 shows an example in which the wireless communication interface 1225 includes multiple BB processors 1226 and multiple RF circuits 1227, the wireless communication interface 1225 may also include a single BB processor 1226 or a single RF circuit 1227.

Second Application Example

Figure 13:
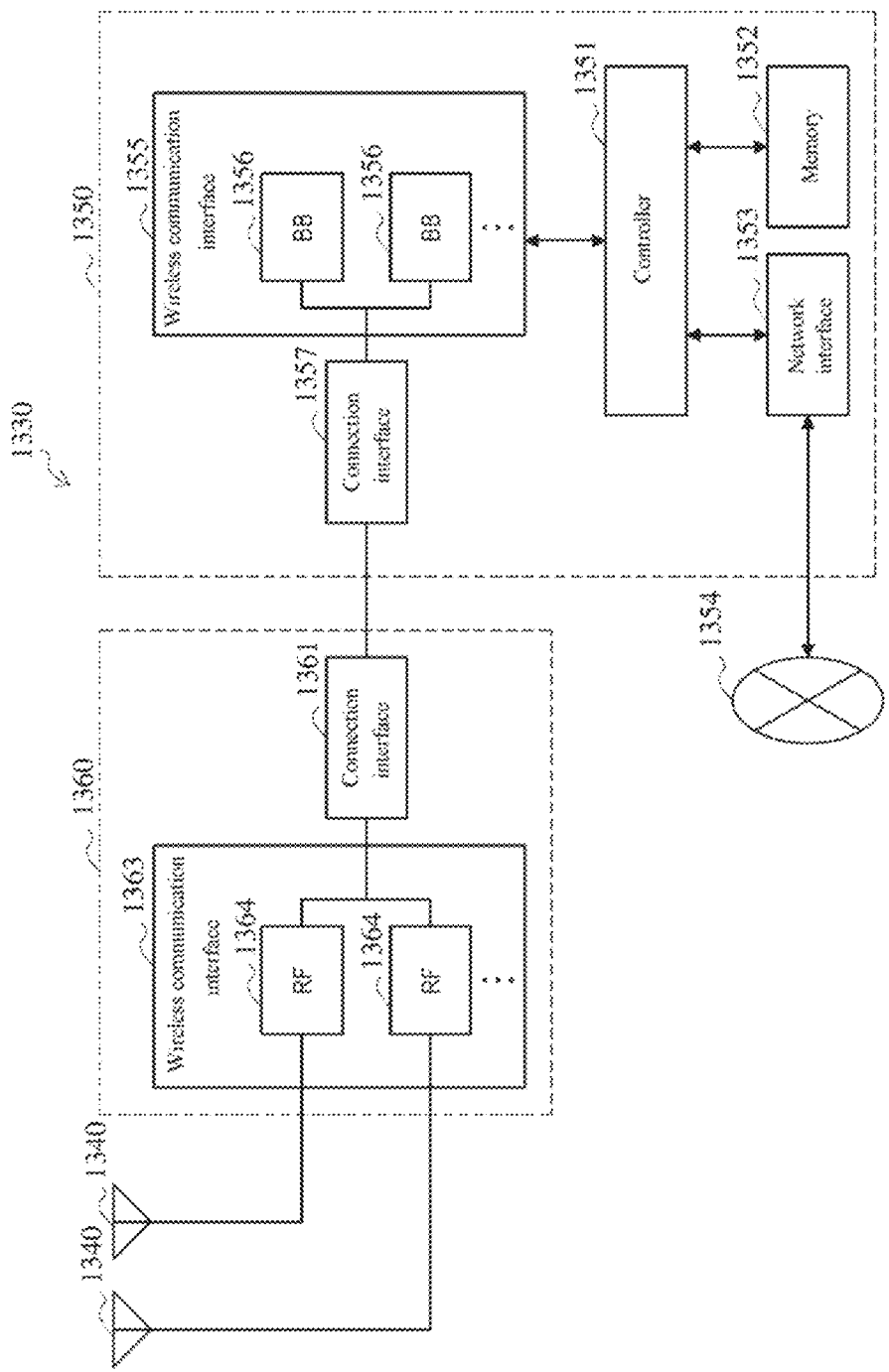
FIG. 13 is a block diagram showing a second example of the schematic configuration of the gNB.

FIG. 13 is a block diagram showing a second example of a schematic configuration of a gNB to which the technology of the present disclosure may be applied. A gNB 1330 includes one or more antennas 1340, a base station device 1350, and an RRH 1360. The RRH 1360 and each antenna 1340 may be connected to each other via an RF cable. The base station device 1350 and the RRH 1360 may be connected to each other via a high-speed line such as an optical fiber cable.

Each of the antennas 1340 includes a single or multiple antenna elements (such as multiple antenna elements included in a MIMO antenna) and is used for the RRH 1360 to transmit and receive wireless signals. As shown in FIG. 13, the gNB 1330 may include multiple antennas 1340. For example, the multiple antennas 1340 may be compatible with multiple frequency bands used by the gNB 1330. Although FIG. 13 shows an example in which the gNB 1330 includes multiple antennas 1340, the gNB 1330 may also include a single antenna 1340.

The base station device 1350 includes a controller 1351, a memory 1352, a network interface 1353, a wireless communication interface 1355, and a connection interface 1357. The controller 1351, the memory 1352, and the network interface 1353 are the same as the controller 1221, the memory 1222, and the network interface 1223 described with reference to FIG. 12.

The wireless communication interface 1355 supports any cellular communication scheme (such as LTE and LTE-Advanced), and provides wireless communication to terminals located in a sector corresponding to the RRH 1360 via the RRH 1360 and the antenna 1340. The wireless communication interface 1355 may generally include a BB processor 1356, for example. The BB processor 1356 is the same as the BB processor 1226 described with reference to FIG. 12 except that the BB processor 1356 is connected to an RF circuit 1364 of the RRH 1360 via the connection interface 1357. As shown in FIG. 13, the wireless communication interface 1355 may include multiple BB processors 1356. For example, the multiple BB processors 1356 may be compatible with multiple frequency bands used by the gNB 1330. Although FIG. 13 shows an example in which the wireless communication interface 1355 includes multiple BB processors 1356, the wireless communication interface 1355 may also include a single BB processor 1356.

The connection interface 1357 is an interface for connecting the base station device 1350 (a wireless communication interface 1355) to the RRH 1360. The connection interface 1357 may also be a communication module for performing communication in the above high-speed line that connects the base station device 1350 (the wireless communication interface 1355) to the RRH 1360.

The RRH 1360 includes a connection interface 1361 and a wireless communication interface 1363.

The connection interface 1361 is an interface for connecting the RRH 1360 (a wireless communication interface 1363) to the base station device 1350. The connection interface 1361 may also be a communication module for performing communication in the above high-speed line.

The wireless communication interface 1363 transmits and receives wireless signals via the antenna 1340. The wireless communication interface 1363 may generally include, for example, an RF circuit 1364. The RF circuit 1364 may include, for example, a frequency mixer, a filter, and an amplifier, and transmit and receive wireless signals via the antenna 1340. As shown in FIG. 13, the wireless communication interface 1363 may include multiple RF circuits 1364. For example, the multiple RF circuits 1364 may support multiple antenna elements. Although FIG. 13 shows an example in which the wireless communication interface 1363 includes multiple RF circuits 1364, the wireless communication interface 1363 may also include a single RF circuit 1364.

In the gNB 1200 shown in FIG. 12 and the gNB 1330 shown in FIG. 13, the configuration unit 210 and the generation unit 220 described in FIG. 2 may be implemented by the controller 1221 and/or the controller 1351. At least part of the functions may also be implemented by the controller 1221 and the controller 1351. For example, the controller 1221 and/or the controller 1351 may perform the functions of configuring a transmit beam for sending an uplink signal and generating configuration information by executing instructions stored in a corresponding memory.

Application Examples of the Terminal Device

First Application Example

Figure 14:
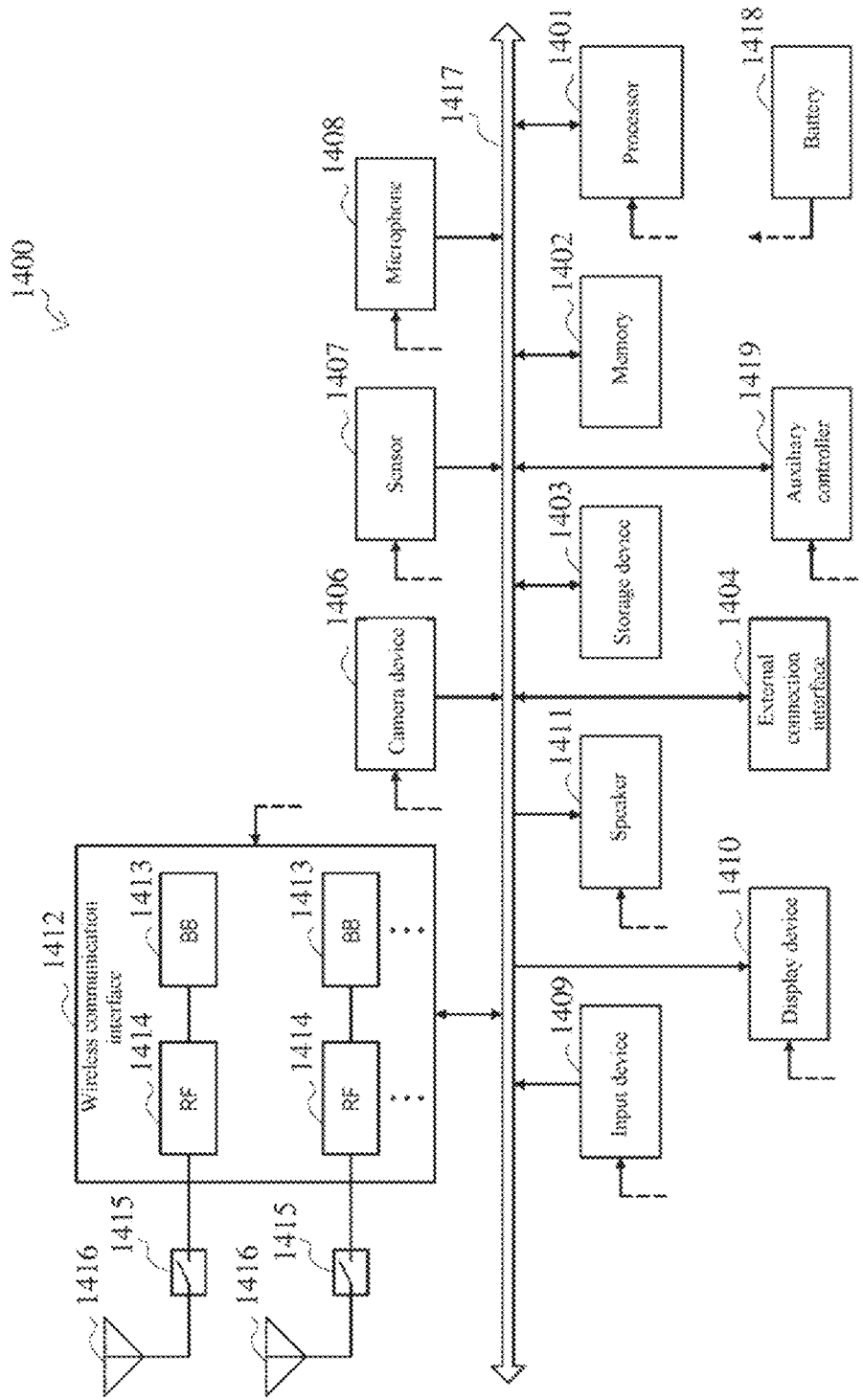
FIG. 14 is a block diagram showing an example of a schematic configuration of a smart phone.

FIG. 14 is a block diagram showing an example of a schematic configuration of a smart phone 1400 to which the technology of the present disclosure may be applied. The smart phone 1400 includes a processor 1401, a memory 1402, a storage device 1403, an external connection interface 1404, a camera device 1406, a sensor 1407, a microphone 1408, an input device 1409, a display device 1410, a speaker 1411, a wireless communication interface 1412, one or more antenna switches 1415, one or more antennas 1416, a bus 1417, a battery 1418, and an auxiliary controller 1419.

The processor 1401 may be, for example, a CPU or a system on a chip (SoC), and controls functions of an application layer and another layer of the smart phone 1400. The memory 1402 includes an RAM and an ROM, and stores programs executed by the processor 1401 and data. The storage device 1403 may include a storage medium such as a semiconductor memory and a hard disk. The external connection interface 1404 is an interface for connecting an external device (such as a memory card and a universal serial bus (USB) device) to the smartphone 1400.

The camera device 1406 includes an image sensor (such as a charge coupled device (CCD) and a complementary metal oxide semiconductor (CMOS)), and generates a captured image. The sensor 1407 may include a group of sensors, such as a measurement sensor, a gyroscope sensor, a geomagnetic sensor, and an acceleration sensor. The microphone 1408 converts sounds inputted to the smart phone 1400 into audio signals. The input device 1409 includes, for example, a touch sensor configured to detect a touch on the screen of the display device 1410, a keypad, a keyboard, a button, or a switch, and receives operations or information inputted from a user. The display device 1410 includes a screen (such as a liquid crystal display (LCD) and an organic light emitting diode (OLED) display), and displays an output image of the smartphone 1400. The speaker 1411 converts the audio signals outputted from the smart phone 1400 into sounds.

The wireless communication interface 1412 supports any cellular communication scheme (such as LTE and LTE-Advanced), and performs wireless communications. The wireless communication interface 1412 may generally include, for example, a BB processor 1413 and an RF circuit 1414. The BB processor 1413 may perform, for example, encoding/decoding, modulation/demodulation, and multiplexing/demultiplexing, and perform various types of signal processing for wireless communications. In addition, the RF circuit 1414 may include, for example, a frequency mixer, a filter, and an amplifier, and transmit and receive wireless signals via the antenna 1416. The wireless communication interface 1412 may be a chip module on which the BB processor 1413 and the RF circuit 1414 are integrated. As shown in FIG. 14, the wireless communication interface 1412 may include multiple BB processors 1413 and multiple RF circuits 1414. Although FIG. 14 shows an example in which the wireless communication interface 1412 includes multiple BB processors 1413 and multiple RF circuits 1414, the wireless communication interface 1412 may also include a single BB processor 1413 or a single RF circuit 1414.

Furthermore, in addition to the cellular communication scheme, the wireless communication interface 1412 may support another type of wireless communication scheme, such as a short-range wireless communication scheme, a near field communication scheme, and a wireless local area network (LAN) scheme. In this case, the wireless communication interface 1412 may include a BB processor 1413 and an RF circuit 1414 for each wireless communication scheme.

Each of the antenna switches 1415 switches the connection destination of the antenna 1416 among multiple circuits (for example, circuits for different wireless communication schemes) included in the wireless communication interface 1412.

Each of the antennas 1416 includes a single or multiple antenna elements (such as multiple antenna elements included in a MIMO antenna), and is used for the wireless communication interface 1412 to transmit and receive wireless signals. As shown in FIG. 14, the smart phone 1400 may include multiple antennas 1416. Although FIG. 14 shows an example in which the smart phone 1400 includes multiple antennas 1416, the smart phone 1400 may also include a single antenna 1416.

In addition, the smart phone 1400 may include an antenna 1416 for each wireless communication scheme. In this case, the antenna switch 1415 may be omitted from the configuration of the smart phone 1400.

The bus 1417 connects the processor 1401, the memory 1402, the storage device 1403, the external connection interface 1404, the camera device 1406, the sensor 1407, the microphone 1408, the input device 1409, the display device 1410, the speaker 1411, the wireless communication interface 1412, and the auxiliary controller 1419 to each other. The battery 1418 supplies power to each block of the smart phone 1400 shown in FIG. 14 via a feeder line, which is partially shown as a dashed line in FIG. 14. The auxiliary controller 1419 operates minimum necessary functions of the smartphone 1400 in a sleep mode, for example.

In the smart phone 1400 shown in FIG. 14, the determination unit 920 and the scanning unit 930 described in FIG. 9 may be implemented by the processor 1401 or the auxiliary controller 1419. At least a part of the functions may also be implemented by the processor 1401 or the auxiliary controller 1419. For example, the processor 1401 or the auxiliary controller 1419 may execute the functions of determining a transmit beam for sending an uplink signal and performing an uplink beam scanning by executing instructions stored in the memory 1402 or the storage device 1403.

Second Application Example

Figure 15:
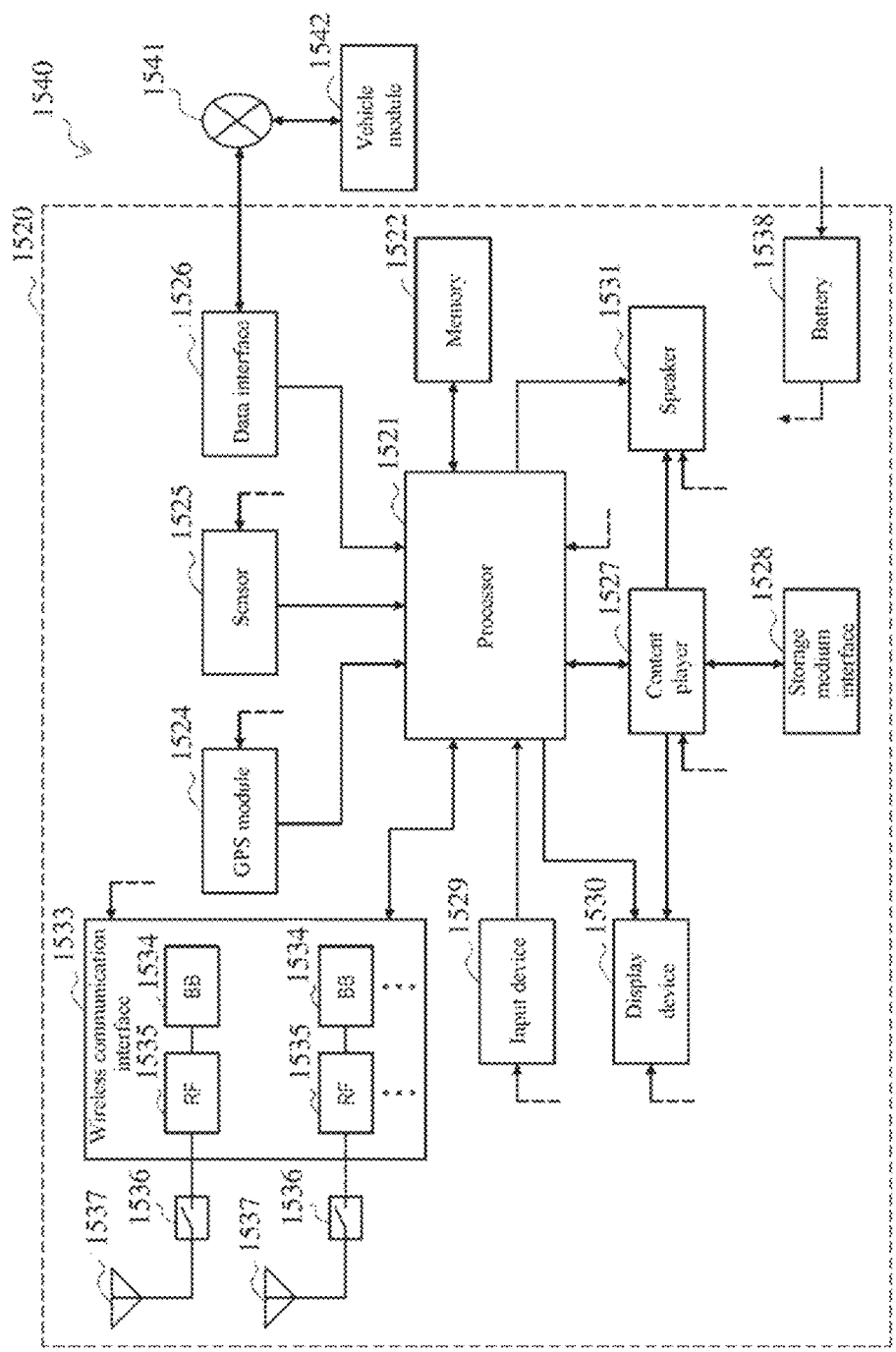
FIG. 15 is a block diagram showing an example of a schematic configuration of a car navigation device.

FIG. 15 is a block diagram showing an example of a schematic configuration of a car navigation device 1520 to which the technology of the present disclosure may be applied. The car navigation device 1520 includes a processor 1521, a memory 1522, a global positioning system (GPS) module 1524, a sensor 1525, a data interface 1526, a content player 1527, a storage medium interface 1528, an input device 1529, a display device 1530, a speaker 1531, a wireless A communication interface 1533, one or more antenna switches 1536, one or more antennas 1537, and a battery 1538.

The processor 1521 may be, for example, a CPU or SoC, and controls a navigation function and other functions of the car navigation device 1520. The memory 1522 includes an RAM and an ROM, and stores data and programs executed by the processor 1521.

The GPS module 1524 measure a position (such as a latitude, a longitude, and an altitude) of the car navigation device 1520 using GPS signals received from GPS satellites. The sensor 1525 may include a group of sensors, such as a gyroscope sensor, a geomagnetic sensor, and an air pressure sensor. The data interface 1526 is connected to, for example, an in-vehicle network 1541 via a terminal not shown, and acquires data (such as vehicle speed data) generated by the vehicle.

The content player 1527 reproduces content stored in a storage medium (such as a CD and a DVD), which is inserted into the storage medium interface 1528. The input device 1529 includes, for example, a touch sensor configured to detect a touch on the screen of the display device 1530, a button, or a switch, and receives operations or information inputted from a user. The display device 1530 includes a screen such as an LCD or OLED display, and displays images of navigation functions or reproduced content. The speaker 1531 outputs the sound of the navigation function or the reproduced content.

The wireless communication interface 1533 supports any cellular communication scheme (such as LTE and LTE-Advanced), and performs wireless communications. The wireless communication interface 1533 may generally include, for example, a BB processor 1534 and an RF circuit 1535. The BB processor 1534 may perform, for example, encoding/decoding, modulation/demodulation, and multiplexing/demultiplexing, and perform various types of signal processing for wireless communications. In addition, the RF circuit 1535 may include, for example, a frequency mixer, a filter, and an amplifier, and transmit and receive wireless signals via the antenna 1537. The wireless communication interface 1533 may also be a chip module on which the BB processor 1534 and the RF circuit 1535 are integrated. As shown in FIG. 15, the wireless communication interface 1533 may include multiple BB processors 1534 and multiple RF circuits 1535. Although FIG. 15 shows an example in which the wireless communication interface 1533 includes multiple BB processors 1534 and multiple RF circuits 1535, the wireless communication interface 1533 may also include a single BB processor 1534 or a single RF circuit 1535.

Furthermore, in addition to the cellular communication scheme, the wireless communication interface 1533 may support another type of wireless communication scheme, such as a short-range wireless communication scheme, a near field communication scheme, and a wireless LAN scheme. In this case, the wireless communication interface 1533 may include a BB processor 1534 and an RF circuit 1535 for each wireless communication scheme.

Each of the antenna switches 1536 switches a connection destination of the antenna 1537 among multiple circuits (such as circuits for different wireless communication schemes) included in the wireless communication interface 1533.

Each of the antennas 1537 includes a single or multiple antenna elements (such as multiple antenna elements included in a MIMO antenna), and is used for the wireless communication interface 1533 to transmit and receive wireless signals. As shown in FIG. 15, the car navigation device 1520 may include multiple antennas 1537. Although FIG. 15 shows an example in which the car navigation device 1520 includes multiple antennas 1537, the car navigation device 1520 may also include a single antenna 1537.

In addition, the car navigation device 1520 may include an antenna 1537 for each wireless communication scheme. In this case, the antenna switch 1536 may be omitted from the configuration of the car navigation device 1520.

The battery 1538 supplies power to each block of the car navigation device 1520 shown in FIG. 15 via a feeder line, which is partially shown as a dashed line in FIG. 15. The battery 1538 accumulates power supplied from the vehicle.

In the car navigation device 1520 shown in FIG. 15, the determination unit 920 and the scanning unit 930 described in FIG. 9 may be implemented by the processor 1521. At least part of the functions may also be implemented by the processor 1521. For example, the processor 1521 may execute the functions of determining a transmit beam for sending an the uplink signal and performing uplink beam scanning by executing instructions stored in the memory 1522.

The technology of the present disclosure may also be implemented as an in-vehicle system (or vehicle) 1540 including one or more blocks of a car navigation device 1520, an in-vehicle network 1541, and a vehicle module 1542. The vehicle module 1542 generates vehicle data (such as a vehicle speed, an engine speed, and failure information), and outputs the generated data to the vehicle network 1541.

The preferred embodiments of the present disclosure have been described above with reference to the drawings, but the present disclosure is not limited to the above examples. Those skilled in the art may obtain various changes and modifications within the scope of the claims, and it should be understood that these changes and modifications should naturally fall within the technical scope of the present disclosure.

For example, the units shown in dashed boxes in the functional block diagrams shown in the drawings all indicate that the functional units are optional in the corresponding device, and these optional functional units may be combined in an appropriate manner to achieve required features.

For example, multiple functions included in one unit in the above embodiments may be realized by separate devices. Alternatively, the multiple functions implemented by multiple units in the above embodiments may be implemented by separate devices, respectively. In addition, one of the above functions may be implemented by multiple units. It is to be noted that, such a configuration is included in the technical scope of the present disclosure.

In this specification, the steps described in the flowchart include not only processing performed in time series in the described order, but also processing performed in parallel or individually rather than necessarily in time series. Furthermore, even in the steps processed in time series, the order may be changed appropriately.

Although the embodiments of the present disclosure are described in detail above with reference to the drawings, it should be understood that the above embodiments are only used to illustrate the present disclosure, and do not constitute a limitation to the present disclosure. For those skilled in the art, various modifications and changes may be made to the above embodiments without departing from the essence and scope of the present disclosure. Therefore, the scope of the present disclosure is limited only by the claims and their equivalent meanings.

The invention claimed is:

1. A network side equipment, comprising processing circuitry configured to:
   identify a plurality of transmit beams from a plurality of antenna panels of a user equipment that are to be used by the user equipment to transmit a data signal,
   generate downlink control information (DCI) that includes:
   a plurality of SRS Resource Set Indicator (SRSI) fields, each of the plurality of SRSI fields indicating specific ones of the plurality of antenna panels that are to be used for transmitting the uplink signal, and plural sets of SRS Resource Indicator (SRI) fields, each of the plural sets of SRS Resource Indicator (SRI) fields corresponding to one of the plurality of SRSI fields and indicating one or more specific transmit beams of a corresponding antenna panel that are to be used for transmitting the uplink signal;

transmit the DCI to the user equipment; and receive the uplink signal from the user equipment via one or more sets of antenna panels and transmit beams that were indicated in the DCI, wherein each SRSI field and corresponding SRI fields form a contiguous DCI SRS data block, with all DCI SRS data blocks being contiguous in time.

2. The network side equipment according to claim 1, wherein the uplink signal comprises a data signal on a Physical Uplink Shared Channel (PUSCH).

3. A user equipment, comprising processing circuitry configured to:

receive, from a network side device that has identified a plurality of transmit beams from a plurality of antenna panels of the user equipment that are to be used by the user equipment to transmit a data signal, downlink control information (DCI) that includes:

a plurality of SRS Resource Set Indicator (SRSI) fields, each of the plurality of SRSI fields indicating specific ones of the plurality of antenna panels that are to be used for transmitting the uplink signal, and plural sets of SRS Resource Indicator (SRI) fields, each of the plural sets of SRS Resource Indicator (SRI) fields corresponding to one of the plurality of SRSI fields and indicating one or more specific transmit beams of a corresponding antenna panel that are to be used for transmitting the uplink signal; and transmit the uplink signal to the network side device via one or more sets of antenna panels and transmit beams that were indicated in the DCI, wherein each SRSI field and corresponding SRI fields form a contiguous DCI SRS data block, with all DCI SRS data blocks being contiguous in time.

4. The user equipment according to claim 3, wherein the uplink signal comprises a data signal on a Physical Uplink Shared Channel (PUSCH).

5. A wireless communication method performed by a network side equipment, comprising:

identifying a plurality of transmit beams from a plurality of antenna panels of a user equipment that are to be used by the user equipment to transmit a data signal:

generating downlink control information (DCI) that includes:

a plurality of SRS Resource Set Indicator (SRSI) fields, each of the plurality of SRSI fields indicating specific ones of the plurality of antenna panels that are to be used for transmitting the uplink signal, and plural sets of SRS Resource Indicator (SRI) fields, each of the plural sets of SRS Resource Indicator (SRI) fields corresponding to one of the plurality of SRSI fields and indicating one or more specific transmit beams of a corresponding antenna panel that are to be used for transmitting the uplink signal;

transmit the DCI to the user equipment; and receiving the uplink signal from the user equipment via one or more sets of antenna panels and transmit beams that were indicated in the DCI, wherein each SRSI field and corresponding SRI fields form a contiguous DCI SRS data block, with all DCI SRS data blocks being contiguous in time.

6. The wireless communication method according to claim 5, wherein the uplink signal comprises a data signal on a Physical Uplink Shared Channel (PUSCH).

7. A wireless communication method performed by user equipment, comprising:

receiving, from a network side device that has identified a plurality of transmit beams from a plurality of antenna panels of the user equipment that are to be used by the user equipment to transmit a data signal, downlink control information (DCI) that includes:

a plurality of SRS Resource Set Indicator (SRSI) fields, each of the plurality of SRSI fields indicating specific ones of the plurality of antenna panels that are to be used for transmitting the uplink signal, and plural sets of SRS Resource Indicator (SRI) fields, each of the plural sets of SRS Resource Indicator (SRI) fields corresponding to one of the plurality of SRSI fields and indicating one or more specific transmit beams of a corresponding antenna panel that are to be used for transmitting the uplink signal; and transmitting the uplink signal to the network side device via one or more sets of antenna panels and transmit beams that were indicated in the DCI, wherein each SRSI field and corresponding SRI fields form a contiguous DCI SRS data block, with all DCI SRS data blocks being contiguous in time.

* * * * *